United States Patent
Badding et al.

(10) Patent No.: US 11,795,116 B2
(45) Date of Patent: Oct. 24, 2023

(54) CERAMIC ASSEMBLY AND METHOD OF FORMING THE SAME

(71) Applicant: CORNING INCORPORATED, Corning, NY (US)

(72) Inventors: Michael Edward Badding, Campbell, NY (US); Francis Martin Behan, Corning, NY (US); Seo-Yeong Cho, Suwon-si (KR); Benedict Yorke Johnson, Horseheads, NY (US); Thomas Dale Ketcham, Horseheads, NY (US); Robert George Manley, Vestal, NY (US); Seongho Seok, Seoul (KR); Nikolay Zhelev Zhelev, Painted Post, NY (US); Cheng-Gang Zhuang, Horseheads, NY (US)

(73) Assignee: Corning Incorporated, Corning, NY (US)

(*) Notice: Subject to any disclaimer, the term of this patent is extended or adjusted under 35 U.S.C. 154(b) by 160 days.

(21) Appl. No.: 17/080,906

(22) Filed: Oct. 27, 2020

(65) Prior Publication Data

US 2021/0047243 A1    Feb. 18, 2021

Related U.S. Application Data

(63) Continuation-in-part of application No. 16/534,573, filed on Aug. 7, 2019, now Pat. No. 11,411,245, (Continued)

(51) Int. Cl.
C04B 41/00 (2006.01)
C04B 41/89 (2006.01)
(Continued)

(52) U.S. Cl.
CPC .......... *C04B 41/009* (2013.01); *B05D 3/007* (2013.01); *C04B 41/488* (2013.01);
(Continued)

(58) Field of Classification Search
CPC .............. C04B 41/009; C04B 41/4823; C04B 41/4846; C04B 41/488
See application file for complete search history.

(56) References Cited

U.S. PATENT DOCUMENTS

| 3,843,472 A | 10/1974 | Toussaint et al. |
| 4,525,461 A * | 6/1985 | Boecker ................ C04B 35/565 |
| | | 264/682 |

(Continued)

FOREIGN PATENT DOCUMENTS

| EP | 0939747 A1 | 9/1999 |
| EP | 1922154 A2 | 5/2008 |

(Continued)

OTHER PUBLICATIONS

Hofgen et al., "Annealing and recrystallization of amorphous silicon carbide produced by ion implantation" Journal of Applied Physics, 84, 4769 (1998) (Year: 1998).*

(Continued)

*Primary Examiner* — Alex B Efta
(74) *Attorney, Agent, or Firm* — Russell S. Magaziner

(57) ABSTRACT

Ceramic assembly can comprise a ceramic article comprising a thickness defined between a first major surface and a second major surface. The thickness can be about 100 micrometers or less. The ceramic assembly can comprise a polymer coating deposited over at least an outer peripheral portion of the first major surface of the ceramic article. The polymer coating can comprise a thickness of about 30 micrometers or less. An edge strength of the ceramic assembly can be greater than an edge strength of the ceramic (Continued)

article by about 50 MegaPascals or more. Methods of forming a ceramic assembly can comprise depositing a polymer coating on an outer peripheral portion of a first major surface of a ceramic article. Methods can further comprise curing the polymer coating.

13 Claims, 10 Drawing Sheets

Related U.S. Application Data which is a continuation-in-part of application No. 16/295,673, filed on Mar. 7, 2019, now Pat. No. 10,581,115, which is a continuation of application No. PCT/US2017/067376, filed on Dec. 19, 2017.

(60) Provisional application No. 62/928,575, filed on Oct. 31, 2019, provisional application No. 62/556,712, filed on Sep. 11, 2017, provisional application No. 62/526,806, filed on Jun. 29, 2017, provisional application No. 62/484,106, filed on Apr. 11, 2017, provisional application No. 62/483,726, filed on Apr. 10, 2017, provisional application No. 62/470,550, filed on Mar. 13, 2017, provisional application No. 62/439,613, filed on Dec. 28, 2016, provisional application No. 62/439,609, filed on Dec. 28, 2016, provisional application No. 62/439,598, filed on Dec. 28, 2016, provisional application No. 62/437,157, filed on Dec. 21, 2016.

(51) Int. Cl.
*C04B 41/52* (2006.01)
*B05D 3/00* (2006.01)
*C04B 41/83* (2006.01)
*C04B 41/48* (2006.01)

(52) U.S. Cl.
CPC ...... *C04B 41/4823* (2013.01); *C04B 41/4846* (2013.01); *C04B 41/83* (2013.01); *C04B 41/89* (2013.01)

(56) References Cited

U.S. PATENT DOCUMENTS

| 5,435,889 | A | * | 7/1995 | Dietrich | C04B 41/5025 |
| | | | | | 427/292 |
| 5,480,695 | A | * | 1/1996 | Tenhover | G11B 5/73915 |
| | | | | | 428/167 |
| 5,567,235 | A | * | 10/1996 | Carson | C08J 7/0427 |
| | | | | | 106/287.15 |
| 5,733,622 | A | | 3/1998 | Starcke et al. | |
| 7,166,326 | B1 | | 1/2007 | DiStefano | |
| 9,556,022 | B2 | | 1/2017 | Pahl | |
| 2009/0324899 | A1 | | 12/2009 | Feinstein et al. | |

FOREIGN PATENT DOCUMENTS

| JP | 2017-146565 A | | 8/2017 | | |
| WO | 99/12859 A1 | | 3/1999 | | |
| WO | WO-9912859 A1 | * | 3/1999 | ........... | C03C 17/001 |
| WO | 2007/008426 A2 | | 1/2007 | | |
| WO | WO-2007008426 A2 | * | 1/2007 | ........... | C03C 17/007 |

OTHER PUBLICATIONS

Livanov et al., "Nanocomposite Thin Film Coatings For Brittle Materials", Nanocomposites, 2016, pp. 2055-0332.
Wen et al., "Edge-Strengthening Of Flat Glass With Acrylate Coatings", Journal of Non-Crystalline Solids vol. 354, 2008, pp. 5060-5067.

* cited by examiner

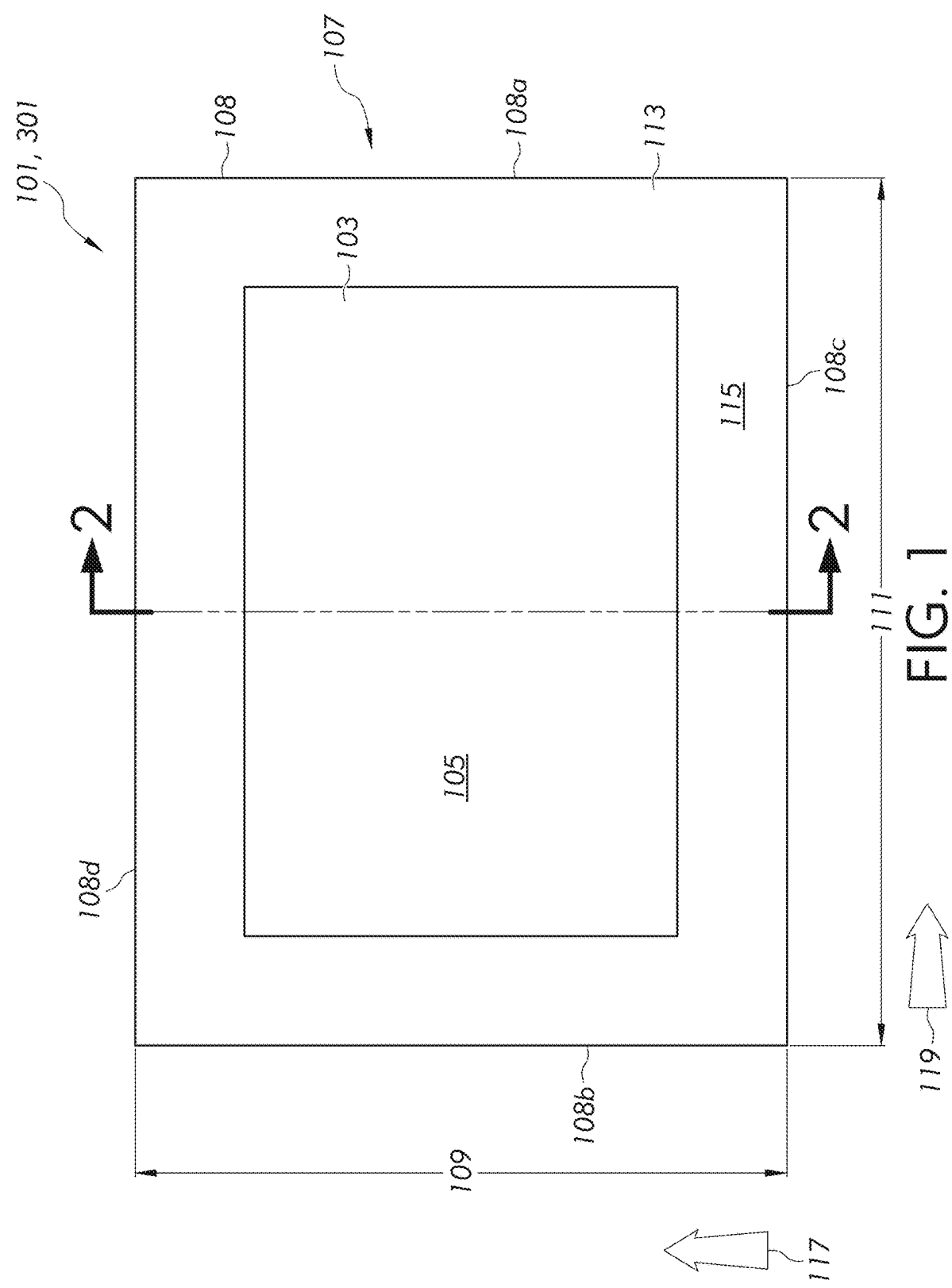

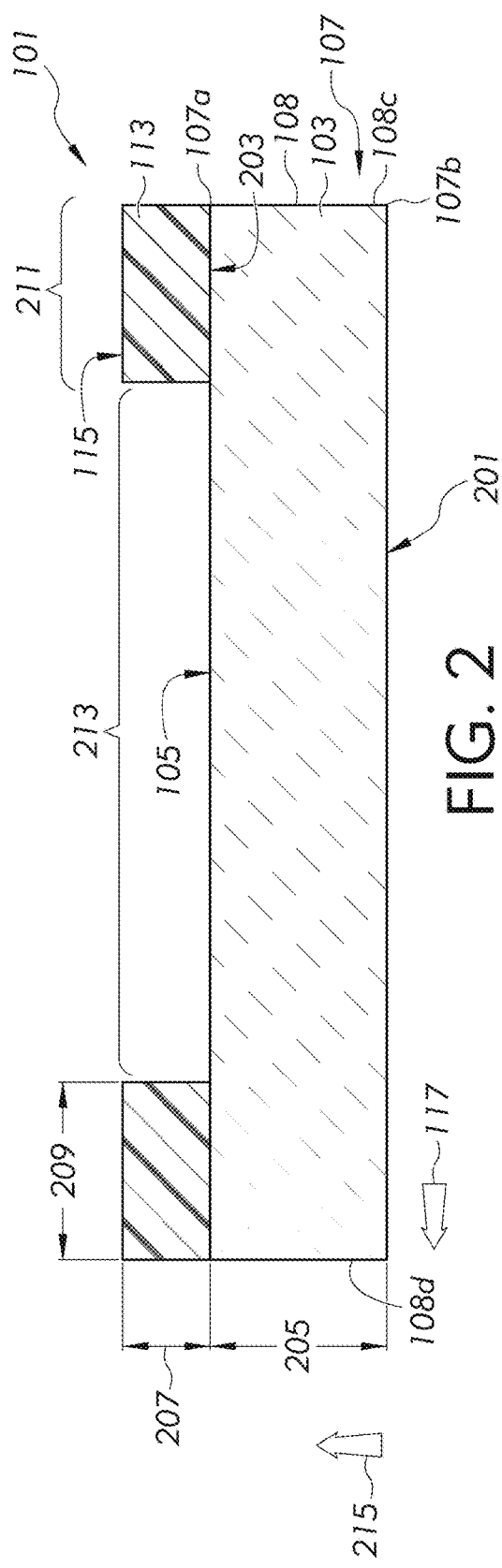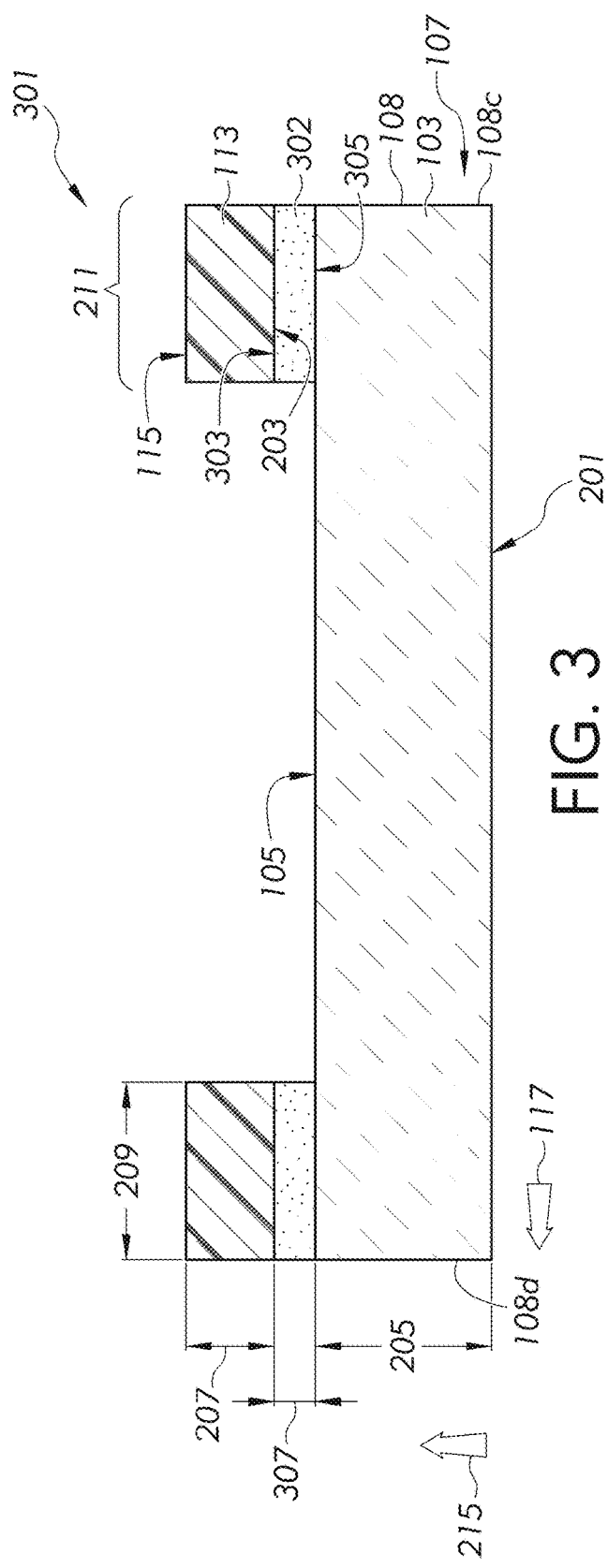

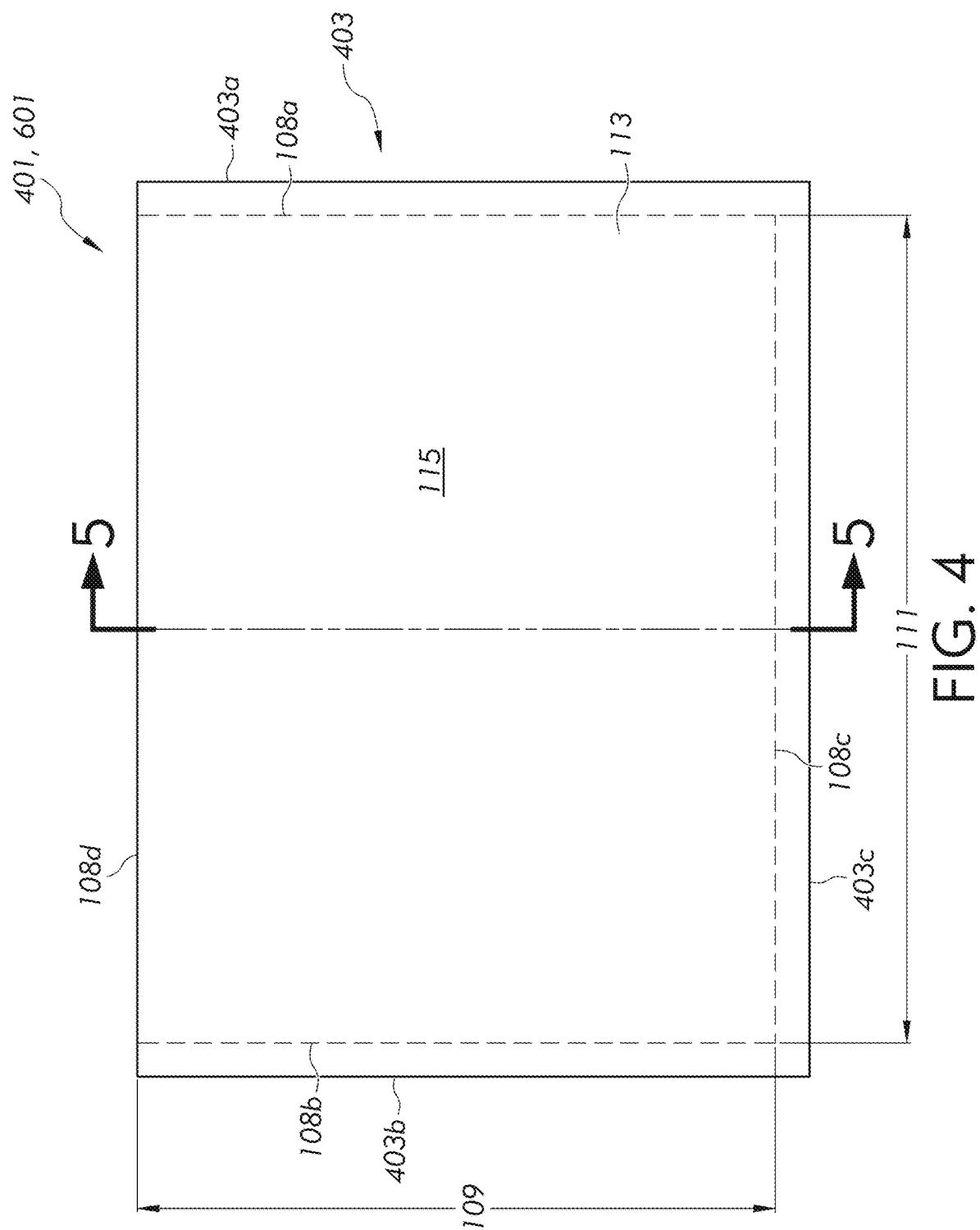

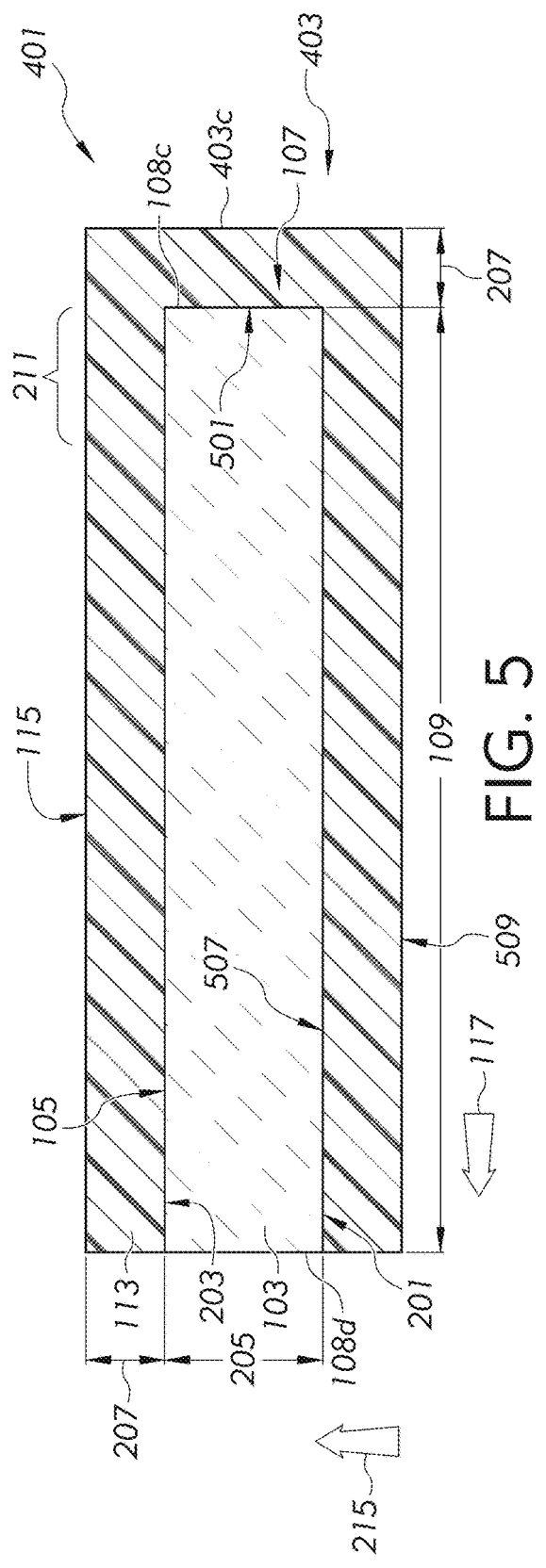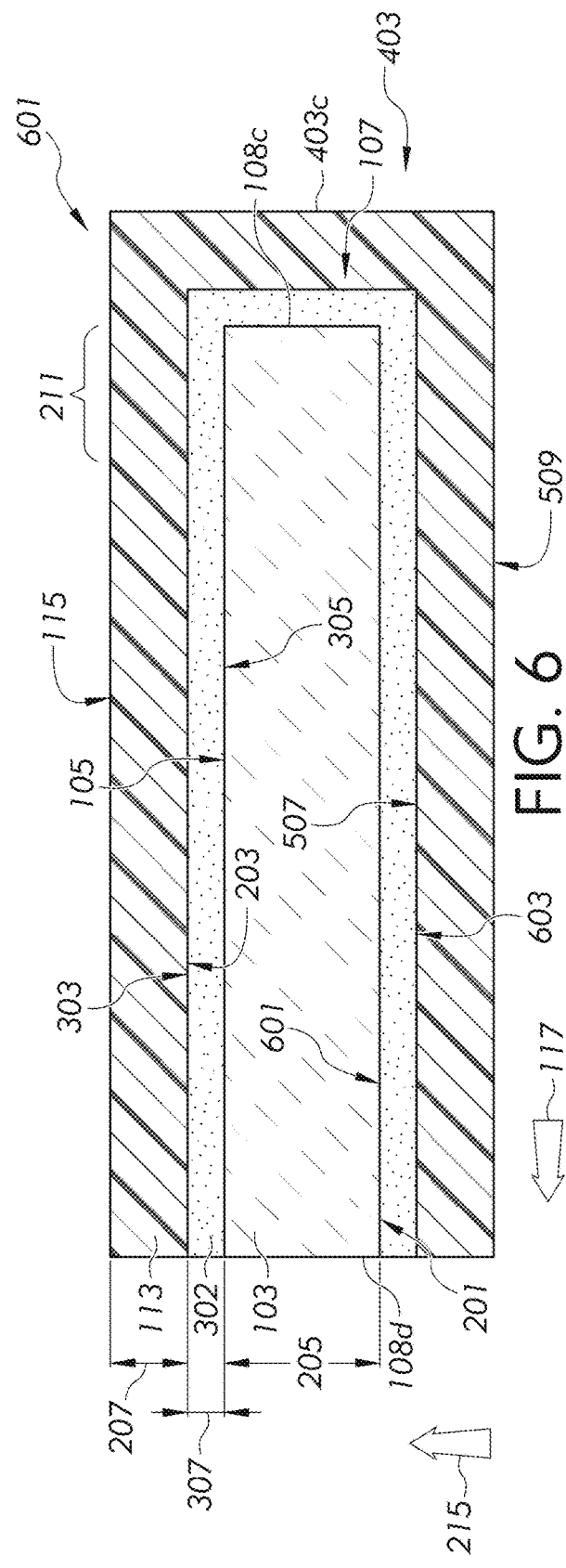

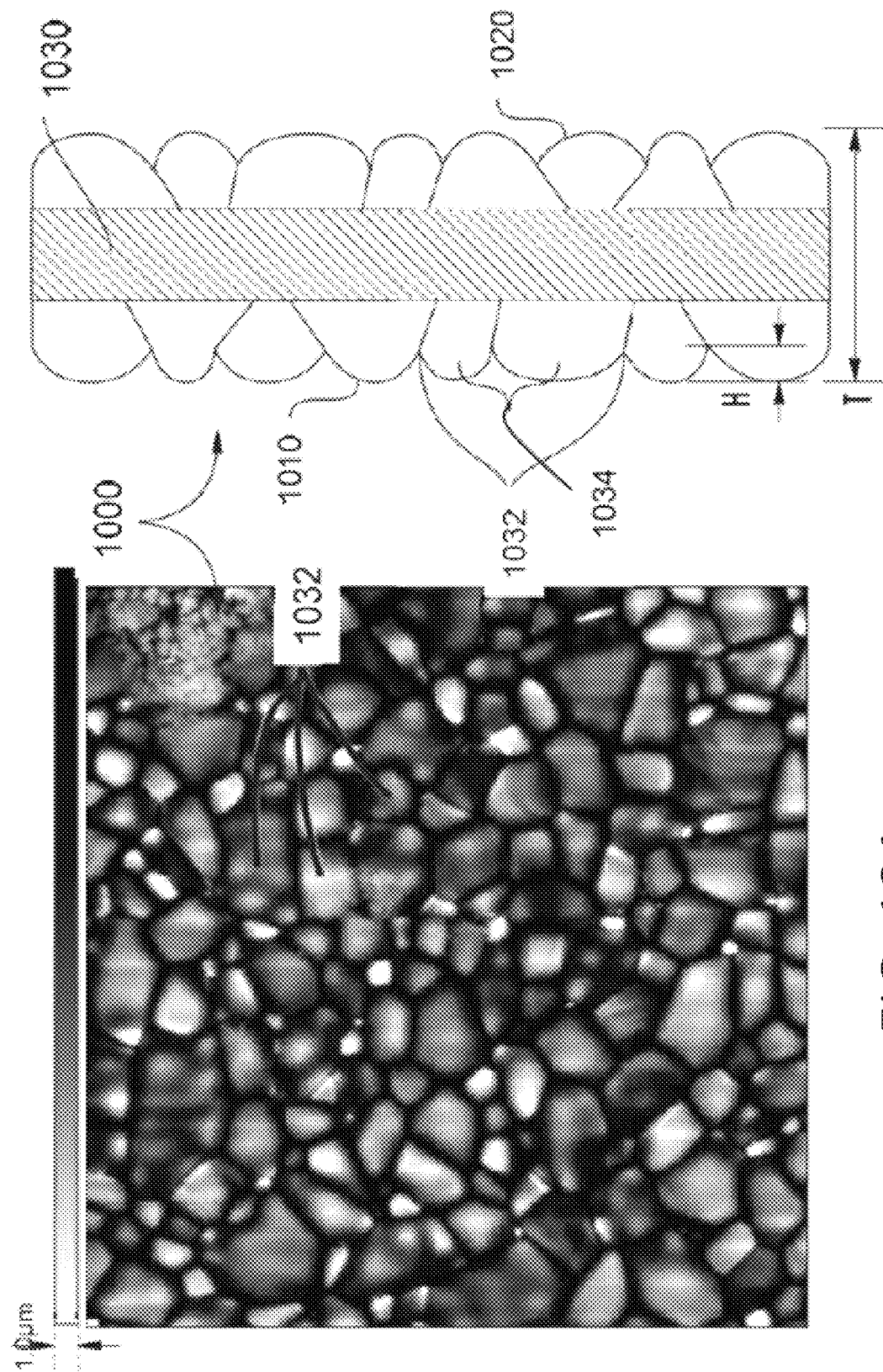

CERAMIC ASSEMBLY AND METHOD OF FORMING THE SAME

CROSS-REFERENCE TO RELATED APPLICATIONS

This Application claims priority to U.S. application Ser. No. 62/928,575 filed Oct. 31, 2019 and is a continuation-in-part of U.S. application Ser. No. 16/534,573 filed Aug. 7, 2019, issued as U.S. Pat. No. 11,411,245 on Aug. 9, 2022, which is a continuation of U.S. application Ser. No. 16/295,673 filed Mar. 7, 2019, which issued as U.S. Pat. No. 10,581,115 on Mar. 3, 2020 and which is a continuation of International Application No. PCT/US2017/067376 filed Dec. 19, 2017, which claims the priority benefit of U.S. Application No. 62/556,712 filed Sep. 11, 2017, 62/526,806 filed Jun. 29, 2017, 62/484,106 filed Apr. 11, 2017, 62/483,726 filed Apr. 10, 2017, 62/470,550 filed Mar. 13, 2017, 62/439,609 filed Dec. 28, 2016, 62/439,598 filed Dec. 28, 2016, 62/439,613 filed Dec. 28, 2016, and 62/437,157 filed Dec. 21, 2016, each of which is incorporated by reference herein in its entirety.

FIELD

The present disclosure relates generally to ceramic assembly and methods of forming ceramic assembly and, more particularly, to ceramic assembly and methods for forming ceramic assembly comprising a polymer coating deposited on a ceramic article.

BACKGROUND

Ceramic articles, such as thin sheets, tapes, or ribbons of ceramic have many potential uses, such as serving as waveguides, when the ceramic is transmissive to light, serving as substrates that may be coated or laminated, and integrated in batteries and other components, or used as or joined with a substrate such as to act as a dielectric in an electronics package (e.g., LED package), or other applications. Various material properties, particularly of ceramic materials, such as high resistivity, low reactivity, low coefficient of thermal expansion, etc. make such articles particularly useful in a wide variety of applications.

Ceramic articles may be manufactured by tape casting, gel casting, or other processes that include sintering of green tapes, such as strips of inorganic grains bound in an organic binder. The binder can provide strength and cohesion to the particles, and the green sheets may be handled for further processing. The green sheets may be placed on a setter or setter board to support the ceramic particles as the binder material in the green sheets is burned off in an oven to form ceramic articles.

However, ceramic articles may be susceptible to damage (e.g., cracking) during processing subsequent to sintering. This can make processing (e.g., handling, polishing, shipping) of such ceramic articles costly and/or cumbersome to avoid such damage. Additionally, some ceramic articles may be so thin that it is hard to process (e.g., polish, handle, ship) using conventional means. For such articles, manufacturers may be unable to remove surface defects induced by setter boards during sintering or defects caused by cutting, which further exacerbates the problem of processing (e.g., handling, polishing, shipping) ceramic articles without damaging (e.g., cracking) the ceramic article.

Consequently, there is a need for ceramic assemblies comprising ceramic articles and methods of forming such ceramic assemblies that can decrease (e.g., eliminate) damage (e.g., cracking) of ceramic articles during processing (e.g., handling, polishing, shipping). Further, there is a need for such ceramic assemblies that can function in the above applications.

SUMMARY

Some example embodiments of the disclosure are described below with the understanding that any of the features of the various embodiments may be used alone or in combination with one another.

In some embodiments, a ceramic assembly can comprise a ceramic article comprising a thickness defined between a first major surface and a second major surface. The thickness can be about 100 micrometers ($\mu$m) or less. The ceramic assembly can comprise a polymer coating deposited over at least an outer peripheral portion of the first major surface of the ceramic article. The polymer coating can comprise a thickness of about 30 $\mu$m or less. An edge strength of the ceramic assembly can be greater than an edge strength of the ceramic article by about 50 MegaPascals (MPa) or more.

In further embodiments, the thickness of the ceramic article can be in a range from about 40 $\mu$m to about 80 $\mu$m.

In further embodiments, the ceramic article can comprise one or more of alumina or zirconia.

In further embodiments, the ceramic article can comprise a sintered ceramic article.

In further embodiments, the thickness of the polymer coating can be in a range from about 5 $\mu$m to about 15 $\mu$m.

In further embodiments, the polymer coating can comprise a fluorine-containing polymer.

In further embodiments, the polymer coating can comprise an imide-containing polymer.

In further embodiments, the polymer coating can comprise a phenol-containing polymer.

In further embodiments, the polymer coating can comprise a low-loss dielectric polymer.

In further embodiments, the edge strength of the ceramic assembly can be about 800 MPa or more.

In even further embodiments, the edge strength of the ceramic assembly can be in a range from about 900 MPa to about 1,500 MPa.

In further embodiments, a difference between the edge strength of the ceramic assembly and the edge strength of the ceramic article can be in a range from about 300 MPa to about 1,000 MPa.

In further embodiments, a length of the ceramic article can be about 1 meter (m) or more.

In further embodiments, a width of the ceramic article can be about 50 millimeters (mm) or more.

In further embodiments, the polymer coating can extend to an edge portion of the ceramic article.

In even further embodiments, the polymer coating can cover the edge portion of the ceramic article.

In further embodiments, the polymer coating can be disposed over at least a portion of the second major surface of the ceramic article.

In further embodiments, the polymer coating can be disposed over the entire first major surface of the ceramic article.

In further embodiments, the polymer coating can contact the first major surface of the ceramic article.

In further embodiments, an adhesion promoter can be positioned between the ceramic article and the polymer coating.

In further embodiments, the polymer coating can consist of a single homogenous polymer coating.

In further embodiments, the polymer coating can comprise a polymer coating cured on the ceramic article.

In some embodiments, methods of forming a ceramic assembly can comprise depositing a polymer coating over an outer peripheral portion of a first major surface of the ceramic article. The ceramic article can comprise a thickness between the first major surface and a second major surface of about 100 micrometers (μm) or less. The deposited polymer coating can comprise a thickness of about 30 μm or less. Methods can further comprise curing the polymer coating. Depositing the polymer coating and curing the polymer coating can increase an edge strength of the ceramic assembly relative to the ceramic article by about 50 MegaPascals (MPa) or more.

In further embodiments, methods can further comprise sintering a ceramic green body to form the ceramic article before depositing the polymer coating.

In further embodiments, methods can further comprise cleaning the ceramic article before depositing the polymer coating.

In further embodiments, methods can further comprise depositing an adhesion promoter over the ceramic article before depositing the polymer coating.

In further embodiments, the thickness of the ceramic article can be in a range from about 40 μm to about 80 μm.

In further embodiments, the ceramic article can comprise one or more of alumina or zirconia.

In further embodiments, the deposited polymer coating can comprise a thickness in a range from about 5 μm to about 15 μm.

In further embodiments, the polymer coating can extend to an edge portion of the ceramic article.

In even further embodiments, the polymer coating can cover the edge portion of the ceramic article.

In further embodiments, the polymer coating can cover at least a portion of the second major surface of the ceramic article.

In further embodiments, the deposited polymer coating can be disposed over the entire first major surface of the ceramic article.

In further embodiments, depositing the polymer coating and curing the polymer coating can increase the edge strength of the ceramic assembly relative to the ceramic article in a range from about 300 MPa to about 1,000 MPa.

In further embodiments, the edge strength of the ceramic assembly be can be about 800 MPa or more.

In even further embodiments, the edge strength of the ceramic assembly can be in a range from about 900 MPa to about 1,500 MPa.

Additional embodiments disclosed herein will be set forth in the detailed description that follows. It is to be understood that both the foregoing general description and the following detailed description present embodiments intended to provide an overview or framework for understanding the nature and character of the embodiments disclosed herein. The accompanying drawings are included to provide further understanding and are incorporated into and constitute a part of this specification. The drawings illustrate various embodiments of the disclosure, and together with the description explain the principles and operations thereof.

BRIEF DESCRIPTION OF THE DRAWINGS

These and other embodiments are better understood when the following detailed description is read with reference to the accompanying drawings, in which:

FIG. 1 schematically illustrates exemplary embodiments of a ceramic assemblies in accordance with some embodiments of the disclosure;

FIG. 2 is a cross-sectional view of one embodiment of a ceramic assembly taken along line 2-2 of FIG. 1;

FIG. 3 is a cross-sectional view of another embodiment of a ceramic assembly taken along line 2-2 of FIG. 1;

FIG. 4 schematically illustrates further exemplary embodiments of ceramic assemblies in accordance with some embodiments of the disclosure;

FIG. 5 is a cross-sectional view of one embodiment of a ceramic assembly taken along line 5-5 of FIG. 4;

FIG. 6 is a cross-sectional view of another embodiment of a ceramic assembly taken along line 5-5 of FIG. 4;

FIG. 13A is a digital image of an unpolished surface of a sintered article.

FIG. 13B is a conceptual side profile of the sintered article of FIG. 13A.

DETAILED DESCRIPTION

Figure 7:
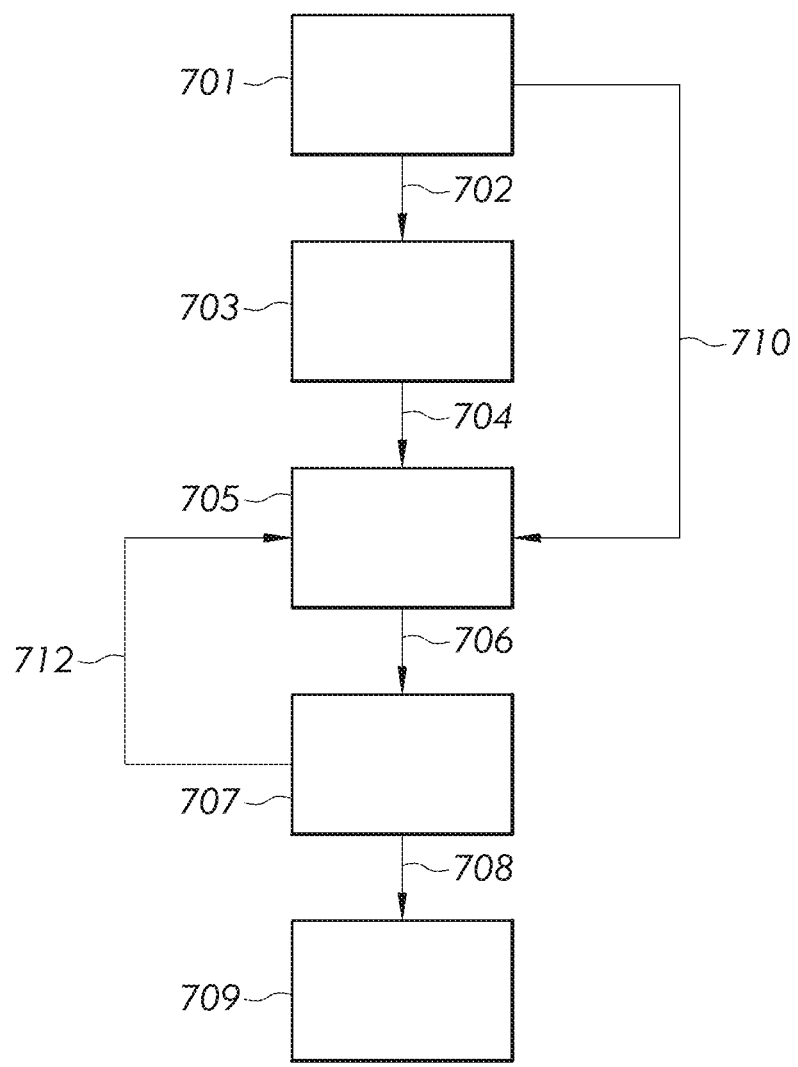
FIG. 7 is a flow chart illustrating example methods making ceramic assemblies in accordance with the embodiments of the disclosure.

Embodiments will now be described more fully hereinafter with reference to the accompanying drawings in which example embodiments are shown. Whenever possible, the same reference numerals are used throughout the drawings to refer to the same or like parts. However, this disclosure may be embodied in many different forms and should not be construed as limited to the embodiments set forth herein.

FIGS. 1-6 illustrate ceramic assemblies with a polymer coating deposited over a ceramic article. Unless otherwise noted, a discussion of features of some embodiments can apply equally to corresponding features of other embodiments of ceramic assemblies unless indicated otherwise.

Ceramic assemblies of the embodiments of the disclosure comprising ceramic articles can decrease (e.g., eliminate) the incidence of damage to the ceramic article relative to the ceramic article alone. Depositing a polymer coating over the ceramic article can increase the edge strength of the ceramic assembly relative to the ceramic article (e.g., by about 50 MegaPascals (MPa) or more, in a range from about 300 MPa to about 1,000 MPa), which can be associated with decreased incidence of damage of the ceramic article. In some embodiments, the polymer coating can provide the ceramic assembly with a high edge strength (e.g., about 800 MPa or more, in a range from about 900 MPa to about 1,500 MPa). Depositing a polymer coating over an outer peripheral portion of the ceramic article can increase the edge strength of the ceramic assembly relative to the ceramic article by reinforcing (e.g., stabilizing, supporting) an outer peripheral portion of the ceramic assembly. In some embodiments, the ceramic article can be a sintered ceramic article, and the polymer coating may strengthen the ceramic article by filling space between ceramic grains of the sintered ceramic article. In some embodiments, the polymer coating can strengthen the ceramic article by filling defects (e.g., voids, cracks) at and/or near the edge portion of the ceramic article, which can decrease (e.g., eliminate) growth (e.g., propagation, elongation) of the defect. Providing a polymer coating that extend to the edge portion of the ceramic article and/or covers the edge portion of the ceramic article can increase the edge strength of the ceramic assembly relative the ceramic article by protecting the ceramic article from impacts. Providing an adhesion promoter can increase the adhesion of the polymer coating to the ceramic article, which can further increase edge strength of the resulting ceramic assembly.

Additionally, providing a ceramic assembly comprising a ceramic article with increased and/or high edge strength can reduce the cost of processing (e.g., handling, polishing, shipping) because of the incidence of damage (e.g., cracking) to the ceramic article is decreased (e.g., eliminated). Also, the ceramic assembly of the embodiments of the disclosure can reduce the complexity of processing (e.g., handling, polishing, shipping) the ceramic article because of the decreased (e.g., reduced) risk of damage to the ceramic article. Further, the polymer coating deposited on the ceramic article may be additionally function in a predetermined application of the ceramic assembly and/or ceramic article. For example, a low-loss dielectric polymer can be useful in waveguide and/or lightguide applications. For example, a fluorine-containing polymer can be useful in display applications where a functional coating (e.g., hydrophobic, low friction, antireflection, antiglare) would otherwise need to be added in subsequent processing.

As schematically illustrated in FIGS. 1-6, example embodiments of ceramic assemblies 101, 301, 401, 601 can comprise a ceramic article 103. The ceramic article 103 can comprise a first major surface 105 and a second major surface 201 (see FIG. 2) opposite the first major surface 105. As shown in FIGS. 2-3 and 5-6, an article thickness 205 can be defined between the first major surface 105 and the second major surface 201 as the average distance between the first major surface 105 and the second major surface 201 across the length and width of the ceramic article 103. In some embodiments, the article thickness 205 of the ceramic article 103 can be about 10 micrometers ($\mu m$) or more, about 20 $\mu m$ or more, about 40 $\mu m$ or more, about 100 $\mu m$ or less, about 80 $\mu m$ or less, or about 60 $\mu m$ or less. In some embodiments, the article thickness 205 of the ceramic article 103 can be in a range from about 10 $\mu m$ to about 100 $\mu m$, from about 10 $\mu m$ to about 80 $\mu m$, from about 10 $\mu m$ to about 60 $\mu m$, from about 20 $\mu m$ to about 100 $\mu m$, from about 20 $\mu m$ to about 80 $\mu m$, from about 20 $\mu m$ to about 60 $\mu m$, from about 40 $\mu m$ to about 100 $\mu m$, from about 40 $\mu m$ to about 80 $\mu m$, from about 40 $\mu m$ to about 60 $\mu m$, or any range or subrange therebetween. In further embodiments, the article thickness can be in a range from about 40 $\mu m$ to about 80 $\mu m$.

In some embodiments, as shown, the first major surface 105 of the ceramic article 103 can extend along a first plane. In further embodiments, as shown, the second major surface 201 can extend along a second plane that may be parallel to the first plane. In even further embodiments, the article thickness 205 may be substantially uniform along the length and/or width of the ceramic article. In some embodiments, although not shown, the first major surface 105 and/or the second major surface 201 of the ceramic article 103 may comprise a non-planar surface and/or the first major surface 105 and/or the second major surface 201 may not extend along corresponding parallel planes. In further embodiments, the ceramic article 103 may comprise a sintered ceramic article, and the first major surface 105 and/or the second major surface 201 of the ceramic article 103 may correspond to the surface profile of a plurality of ceramic particles (e.g., crystal grains) comprising the sintered ceramic article.

The ceramic article 103 can comprise an edge portion 107 comprising an outer peripheral edge 108 circumscribing the ceramic article 103. As further illustrated in FIG. 2, the edge portion 107 can include a first transition edge 107a wherein the first major surface 105 begins transitioning to the outer peripheral edge 108 and a second transition edge 107b where the second major surface 201 begins transitioning to the outer peripheral edge 108. In the illustrated embodiment, the outer peripheral edge comprises a substantially flat surface extending at an approximate 90 degree angle from the first major surface 105 at the first transition edge 107a of the edge portion 107 and extending at an approximate 90 degree angle from the second major surface 201 at the second transition edge 107b of the edge portion 107. Although not shown, the first transition edge 107a and/or the second transition edge 107b may extend inwardly from the outer peripheral edge of the edge portion 107, for example, when the edge portion 107 comprises a beveled edge portion (e.g., rounded edge portion) that may taper to the outer peripheral edge 108 at the outermost portion of the edge portion 107.

As shown in FIGS. 1-6, the outer peripheral edge of the ceramic article can comprise a plurality of outer peripheral edge segments (e.g., including two or more outer peripheral edge segments) although a single outer peripheral edge segment (e.g., a curvilinear outer peripheral edge segment) may be provided in further embodiments. In some embodiments, the outer peripheral edge segment(s) can define a polygonal shape with three or more sides (e.g., triangular shape, rectangular shape), a curvilinear shape (e.g., elliptical shape, circular shape) and/or a combination of shapes.

In further embodiments, as shown, the ceramic article can comprise four outer peripheral edge segments 108a, 108b, 108c, 108d of a quadrilateral ceramic article as shown in FIGS. 1 and 4. A length 111 of the ceramic article 103 can be defined between a first outer peripheral edge segment 108a of the ceramic article 103 and a second outer peripheral edge segment 108b of the ceramic article 103 that is opposite the first outer peripheral edge segment 108a. A width 109 of the ceramic article 103 can be defined between a third outer peripheral edge segment 108c of the ceramic article 103 and a fourth outer peripheral edge segment 108d of the ceramic article 103 that is opposite the third outer peripheral edge segment 108c. As further shown in FIG. 1, the length 111 can extend in a first direction 119 and the width 109 can extend in a second direction 117 perpendicular to the first direction 119. As shown, in some embodiments, the width 109 can be less than or equal to the length 111 although the width 109 may be greater than the length 111 in further embodiments.

As shown, in some embodiments, the first major surface 105 can extend along the first plane including the first direction 119 of the length 111 and the second direction 117 of the width 109. As further shown, in some embodiments, the second major surface 201 can extend along the second plane also including the first direction 119 of the length 111 and the second direction 117 of the width 109. As shown, in some embodiments, the first major surface 105 may be parallel to the second major surface 201 with each major surface extending along the corresponding first plane and second plane that each include the first direction 119 of the length 111 and the second direction 117 of the width 109.

In some embodiments, the width 109 of the ceramic article 103 and/or the length 111 of the ceramic article 103 can be can be about 1 millimeter (mm) or more, about 10 mm or more, about 30 mm or more, about 50 mm or more, about 30,000 mm or less, about 5,000 mm or less, about 1,000 mm or less, or about 100 mm or less. In some embodiments, width 109 of the ceramic article 103 and/or the length 111 of the ceramic article 103 can be in a range from about 1 mm to about 30,000 mm, from about 1 mm to about 5,000 mm, from about 1 mm to about 1,000 mm, from about 1 mm to about 100 mm, from about 10 mm to about 30,000 mm, from about 10 mm to about 5,000 mm, from about 10 mm to about 1,000 mm, from about 10 mm to about 100 mm, from about 30 mm to about 30,000 mm, from about 30 mm to about 5,000 mm, from about 30 mm to about 1,000 mm, from about 30 mm to about 100 mm, from about 50 mm to about 30,000 mm, from about 50 mm to about 5,000 mm, from about 50 mm to about 1,000 mm, from about 50 mm to about 100 mm, or any range or subrange therebetween. In further embodiments, the length 111 of the ceramic article 103 can be about 1 meter (m) or more, about 3 m or more, about 5 m or more, about 30 m or less, about 10 m or less, or about 5 m or less. In further embodiments, the length 111 of the ceramic article 103 can be in a range from about 1 m to about 30 m, from about 1 m to about 10 m, from about 1 m to about 5 m, from about 3 m to about 30 m, from about 3 m to about 10 m, from about 3 m to about 5 m, from about 5 m to about 30 m, from about 5 m to about 10 m, or any range or subrange therebetween. In further embodiments, the width 109 of the ceramic article 103 can be about 50 mm or more, about 100 mm or more, about 200 mm or more, about 1,000 mm or less, about 500 mm or less, or about 100 mm or less. In further embodiments, the width 109 of the ceramic article 103 can be in a range from about 50 mm to about 1,000 mm, from about 50 mm to about 500 mm, from about 50 mm to about 100 mm, from about 100 mm to about 1,000 mm, from about 100 mm to about 1,000 mm, from about 100 mm to about 500 mm, from about 200 mm to about 1,000 mm, from about 200 mm to about 500 mm, from about 200 mm to about 100 mm, or any range or subrange therebetween.

The ceramic article 103 can comprise an outer peripheral portion 211 of the first major surface 105, as shown in FIGS. 2-3. As used herein, the outer peripheral portion 211 of the first major surface 105 extending perpendicular to the closest first transition edge 107a of the edge portion 107 inwardly towards a central portion 213 of the first major surface 105 by a distance equal to about 10% of the width 109 of the ceramic article 103 from the closest first transition edge 107a.

In some embodiments, the ceramic article 103 can comprise one or more oxide, nitride, oxynitride, carbide, boride, and/or silicide. Example embodiments of ceramic oxides include zirconia ($ZrO_2$), zircon zirconia ($ZrSiO_4$), an alkali metal oxide (e.g., sodium oxide ($Na_2O$)), an alkali earth metal oxide (e.g., magnesium oxide (MgO)), titania ($TiO_2$), hafnium oxide ($Hf_2O$), yttrium oxide ($Y_2O_3$), iron oxide, beryllium oxide, vanadium oxide ($VO_2$), fused quartz, mullite (a mineral comprising a combination of aluminum oxide and silicon dioxide), and spinel ($MgAl_2O_4$). Example embodiments of ceramic nitrides include silicon nitride ($Si_3N_4$), aluminum nitride (AlN), gallium nitride (GaN), beryllium nitride ($Be_3N_2$), boron nitride (BN), tungsten nitride (WN), vanadium nitride, alkali earth metal nitrides (e.g., magnesium nitride ($Mg_3N_2$)), nickel nitride, and tantalum nitride. Example embodiments of oxynitride ceramics include silicon oxynitride, aluminum oxynitride, and a SiAlON (a combination of alumina and silicon nitride and can have a chemical formula, for example, $Si_{12-m-n}Al_{m+n}OnN_{16-n}$, $Si_{6-n}Al_nO_nN_{8-n}$, or $Si_{2-n}Al_nO_{1+n}N_{2-n}$, where m, n, and the resulting subscripts are all non-negative integers). Example embodiments of carbides and carbon containing ceramics include silicon carbide (SiC), tungsten carbide (WC), an iron carbide, boron carbide ($B_4C$), alkali metal carbides (e.g., lithium carbide ($Li_4C_3$)), alkali earth metal carbides (e.g., magnesium carbide ($Mg_2C_3$)), and graphite. Example embodiments of borides include chromium boride ($CrB_2$), molybdenum boride ($Mo_2B_5$), tungsten boride ($W_2B_5$), iron boride, titanium boride, zirconium boride ($ZrB_2$), hafnium boride ($HfB_2$), vanadium boride ($VB_2$), Niobium boride ($NbB_2$), and lanthanum boride ($LaB_6$). Example embodiments of silicides include molybdenum disilicide ($MoSi_2$), tungsten disilicide ($WSi_2$), titanium disilicide ($TiSi_2$), nickel silicide (NiSi), alkali earth silicide (e.g., sodium silicide (NaSi)), alkali metal silicide (e.g., magnesium silicide ($Mg_2Si$)), hafnium disilicide ($HfSi_2$), and platinum silicide (PtSi). In further embodiments, the ceramic article 103 can comprise one or more of zirconia ($ZrO_2$) (e.g., yttria stabilized zirconia) or alumina ($Al_2O_3$).

As shown in FIGS. 1-6, a polymer coating 113 can be deposited over the first major surface 105 of the ceramic article 103. As shown, the polymer coating 113 can comprise a first major surface 115 and a second major surface 203 opposite the first major surface 115. As shown, the second major surface 203 of the polymer coating 113 can face the first major surface 105 of the ceramic article 103. As used herein, if a first layer and/or component is described as "deposited over" a second layer and/or component, other layers may or may not be present between the first layer and/or component and the second layer and/or component. As used herein, if a first layer and/or component described as "directly contacting" a second layer and/or component means that there are no other layers between the first layer and/or component and the second layer and/or component. In some embodiments, as shown in FIGS. 2 and 5, the polymer coating 113 can directly contact the ceramic article 103. In further embodiments, the polymer coating 113 can directly contact the ceramic article 103 with the second major surface 203 of the polymer coating 113 directly contacting the first major surface 105 of the ceramic article 103. In further embodiments, the ceramic article 103 can be a sintered ceramic article, and directly contacting the ceramic article 103 with the polymer coating 113 may strengthen the ceramic article 103 by filling space between ceramic grains comprising the sintered ceramic article. In some embodiments, the polymer coating can strengthen the ceramic article by filling defects (e.g., voids, cracks) at and/or near the edge of the ceramic article, which can decrease (e.g., eliminate) growth (e.g., propagation, elongation) of the defect.

In some embodiments, as shown in FIGS. 3 and 6, one or more layers can be positioned between the ceramic article 103 and the polymer coating 113. In further embodiments, as shown, an adhesion promoter 302 can be positioned between the ceramic article 103 and the polymer coating 113. Providing an adhesion promoter 302 can increase the adhesion of the polymer coating 113 to the ceramic article 103, which can increase an edge strength of the resulting ceramic assembly, as discussed below. In some embodiments, the polymer coating 113 may not otherwise adhere to the ceramic article 103 but for the adhesion promotor 302, such as where the adhesion promotor is itself an adhesive between the polymer coating 113 and ceramic article 103.

As shown in FIGS. 1-6, the polymer coating 113 can be deposited over at least the outer peripheral portion 211 of first major surface 105 of the ceramic article 103. Throughout the disclosure, the polymer coating 113 can be deposited over at least the outer peripheral portion 211 of the first major surface 105 of the ceramic article 103 by being deposited over at least a portion of the outer peripheral portion 211 of the first major surface 105 of the ceramic article. In some embodiments, the polymer coating 113 can be deposited over at least the outer peripheral portion 211 of the first major surface 105 of the ceramic article 103 by being deposited over less than the entire outer peripheral portion 211. In some embodiments, as shown in FIGS. 1-6, the polymer coating 113 can be deposited over at least the outer peripheral portion 211 of the first major surface 105 of the ceramic article 103 by being deposited over the entire outer peripheral portion 211. In further embodiments, the polymer coating 113 can be deposited over other portions of the ceramic article 103 in addition to a portion of the outer peripheral surface 211 or the entire outer peripheral portion 211 of the first major surface 105 of the ceramic article 103. For example, as shown in FIGS. 4-6, in some embodiments, the polymer coating 113 can be deposited over at least the outer peripheral portion 211 of the first major surface 105 by being deposited over the entire first major surface 105 including the outer peripheral portion 211 of the first major surface 105.

In some embodiments, as shown in FIGS. 1-6, the polymer coating can extend to the edge portion 107 of the ceramic article. For example, with reference to FIG. 2, the polymer coating 113 is deposited over the outer peripheral portion 211 of the first major surface to the first transition edge 107a of the edge portion 107. As shown in FIGS. 1-2, in some embodiments, the polymer coating 113 can circumscribe the central portion 213 of the first major surface 105 while contacting a substantial portion (e.g., the entire) first transition edge 107a of the edge portion 107. Circumscribing the polymer coating 113 about the central portion 213 while extending to the first transition edge 107a of the edge portion 107 can further strengthen the ceramic article by filling defects (e.g., voids, cracks) at and/or near the edge portion (e.g., the entire edge portion) of the ceramic article, which can decrease (e.g., eliminate) growth (e.g., propagation, elongation) of the defect. Additionally, circumscribing the polymer coating 113 about the central portion 213 while extending to the first transition edge 107a of the edge portion 107 can increase an edge strength of the ceramic assembly 101, 301, 401, 601 relative the ceramic article 103 by protecting the ceramic article 103 from impacts.

In some embodiments, as shown in FIGS. 4-6, the polymer coating 113 can optionally cover at least a portion of the edge portion 107 of the ceramic article 103. As used herein, a coating covers the edge portion of an article when the coating is disposed over a portion or the entire surface area of a peripheral location of the edge portion. For example, as shown in FIGS. 4-6, the polymer coating 113 can cover the outer peripheral edge 108 of the edge portion 107 at peripheral locations of the ceramic article 103. In some embodiments, although not shown, the polymer coating 113 can cover portions of the edge portion 107 without covering the outer peripheral edge 108 in further embodiments. As further shown in FIGS. 4-6, the polymer coating 113 can cover the entire edge portion 107 including the outer peripheral edge 108 at some peripheral locations of the ceramic article 103. In some embodiments, the polymer coating 113 can cover the entire edge portion 107 including the outer peripheral edge segment of one or more peripheral portions of the edge portion 107 associated with one or more outer peripheral edge segments. For example, as shown in FIGS. 5-6, the polymer coating 113 can cover the entire edge portion 107 including the first outer peripheral edge segment 108a, the second outer peripheral edge segment 108b and the third outer peripheral edge segment 108c of the outer peripheral edge 108 at peripheral locations between the first transition edge 107a at the first major surface 105 and the second transition edge 107b at the second major surface 201. Providing a polymer coating 113 covering at least a portion of the edge portion 107 of the ceramic article 103 can further help protect the ceramic article 103 from impacts. Additionally, providing a polymer coating 113 covering at least a portion of the edge portion 107 of the ceramic article 103 can fill defects (e.g., voids, cracks) at and/or on the edge portion 107 of the ceramic article 103, which can decrease (e.g., eliminate) growth (e.g., propagation, elongation) of the defect.

In some embodiments, as shown in FIGS. 5-6, the polymer coating 113 can be disposed over at least a portion of the second major surface 201 of the ceramic article 103. In further embodiments, as shown, the polymer coating can be disposed over the entire second major surface 201 of the ceramic article 103. In further embodiments, as shown, a portion of the polymer coating 113 deposited over the second major surface 201 the ceramic article 103 can comprise a first major surface 507 facing the second major surface 201 of the ceramic article and a second major surface 509 opposite the first major surface. In some embodiments, as shown in FIGS. 5-6, the polymer coating 113 can be disposed over the entire first major surface 105. In further embodiments, as shown, the polymer coating 113 can be disposed over the entire first major surface 105, the entire second major surface 201, and at least one peripheral edge segment 108c of the ceramic article 103. Providing the polymer coating 113 disposed over (e.g., covering) the entire first major surface 105 and/or second major surface 201 can help protect the ceramic article 103 from impacts. Further, the polymer coating 113 may be useful in certain applications of the ceramic assembly. For example, the polymer coating 113 can comprise a low-loss dielectric polymer and the application can be as a waveguide where the polymer coating 113 comprises a lower index of refraction than an index of refraction of the ceramic article 103.

In some embodiments, as shown in FIG. 1-3, the polymer coating 113 may be disposed over an outer peripheral portion 211 of the first major surface 105 but not the central portion 213 of the first major surface 105. Providing a polymer coating 113 in the outer peripheral portion 211 can provide the technical benefit of increased edge strength relative to the ceramic article 103 while minimizing material cost by not depositing the polymer coating 113 over the entire first major surface.

In some embodiments, as shown in FIGS. 4-6, the polymer coating 113 can cover an edge portion 107 of the ceramic article 103. In further embodiments, as shown, a portion of the polymer coating 113 disposed over an outer peripheral edge segment 108c can comprise an inner edge surface 501 and an outer edge surface 403 comprising outer edge surface segments 403a-c opposite the inner edge surface 501 of the polymer coating 113. In further embodiments, as shown, the polymer coating 113 can be deposited over more than one transition edge 107a-c and/or more than one outer peripheral edge segment 108a-c of the ceramic article 103. In even further embodiments, as shown, one outer peripheral edge segment 108d of the ceramic article 103 may not be covered. Providing an uncovered outer peripheral edge segment can lower material costs associated with the polymer coating and/or adhesion promoter. Further, providing an uncovered edge segment can simplify handling of the ceramic article during the method of making the ceramic assembly because the uncovered edge segment can be easily attached and removed from processing equipment without becoming covered in adhesion promoter and/or polymer coating. Additionally, providing an uncovered edge segment can be useful in an application of the ceramic assembly, for example, the ceramic assembly can be used as a light guide and light can be coupled into and/or out of the ceramic assembly through the uncovered edge portion.

The polymer coating 113 can comprising a coating thickness 207 in a third direction 215 of the article thickness 205. In some embodiments, the third direction 215 of the article thickness 205 can be perpendicular to the first direction 119 of the length 111 of the ceramic article 103. In some embodiments, the third direction 215 of the article thickness 205 can be perpendicular to the second direction 117 of the width 109 of the ceramic article 103. In some embodiments, the coating thickness 207 of the polymer coating 113 can be about 5 µm or more, about 8 µm or more, about 10 µm or more, about 30 µm or less, about 20 µm or less, or about 15 µm or less. In some embodiments, the coating thickness 207 of the polymer coating 113 can be in a range from about 5 µm to about 30 µm, from about 5 µm to about 20 µm, from about 5 µm to about 15 µm, from about 8 µm to about 30 µm, from about 8 µm to about 20 µm, from about 8 µm to about 15 µm, from about 10 µm to about 30 µm, from about 10 µm to about 20 µm, or any range or subrange therebetween. In further embodiments, the coating thickness can be in a range from about 5 µm to about 15 µm. Providing a polymer coating with a thickness in the above specified range(s) can provide the technical benefit of increased edge strength relative to the ceramic article 103 while minimizing material cost by avoiding an excessively thick polymer coating 113.

In some embodiments, the polymer coating 113 can comprise, without limitation, the following including copolymers and blends thereof: thermoplastics including polystyrene (PS), polycarbonate (PC), polyesters including polyethyleneterephthalate (PET), polyolefins including polyethylene (PE), acrylic polymers including polymethyl methacrylate (PMMA), epoxies, silicones including polydimethylsiloxane (PDMS), and rubbers including polybutadiene, polyisoprene, polychloroprene (e.g., neoprene), polyisobutylene, styrene-butadiene rubbers, and acrylonitrile-butadiene rubbers.

In some embodiments, the polymer coating 113 can comprise one or more of a phenol-containing polymer, an imide-containing polymer, or a fluorine-containing polymer, which can be used in combination with any of the above thermoplastics. In some embodiments, the polymer coating 113 can comprise an imide-containing polymer. Example embodiments of imide-containing polymers include polyimides comprising aliphatic main chains, semi-aromatic main chains, and aromatic main chains. In some embodiments, the polymer coating 113 can comprise a phenol-containing polymer. Example embodiments of phenol-containing polymers include phenol-formaldehyde resins, for example, novolac, resoles, and polyurethanes. In some embodiments, the polymer coating 113 can comprise a fluorine-containing polymer. Example embodiments of fluorine-containing polymers include polytetrafluoroethylene (PTFE), polyvinylfluoride (PVF), polyvinylidene fluoride (PVDF), perfluoropolyether (PFPE), perfluorosulfonic acid (PFSA), perfluoroalkoxy (PFA), fluorinated ethylene propylene (FEP) polymers, and ethylene tetrafluoro ethylene (ETFE) polymers. In further embodiments, the fluorine-containing polymer may comprise an easy-to-clean coating, a low-friction coating, an oleophobic coating, or a combination thereof.

In some embodiments, the polymer coating 113 can comprise a low-loss dielectric polymer. As used herein, a low-loss dielectric polymer is defined as a polymer with a relative dielectric constant of about 10 or less. Throughout the disclosure, a relative dielectric constant of a material is defined as a ratio between the absolute permittivity of the material measured at 20° C. under 1 atmosphere and the permittivity of free space (i.e., a vacuum). For example, the relative dielectric constant of air is about 1.0005, the relative dielectric constant of polytetrafluoroethylene (PFTE) is about 2, the relative dielectric constant of silicon is about 11.68, the relative dielectric constant of water is about 80.2 and the relative dielectric constant of strontium titanate is about 310. In some embodiments, the low-loss dielectric polymer can comprise a relative dielectric constant of about 10 or less, about 8 or less, or about 5 or less. In some embodiments, the low-loss dielectric polymer can comprise a relative dielectric constant in a range from about 1 to about 10, from about 1 to about 8, from about 1 to about 5, from about 2 to about 10, from about 2 to about 8, from about 2 to about 5, from about 5 to about 10, from about 5 to about 8, or any range or subrange therebetween. In further embodiments, the low-loss dielectric polymer can also be a fluorine containing polymer. For example, as discussed above, PTFE is a fluorine containing polymer and PTFE comprises a relative dielectric constant of about 2. Examples embodiments of low-loss dielectric polymers include parylene, polytetrafluoroethylene, polystyrene, polymethacrylates (e.g., polybutylmethacrylate), polyvinylchloride, polyethylene terephthalate, polyurethanes, an epoxy, a rubber, or block copolymers comprising styrene, polyolefins, or polyesters. Examples of rubbers that are hydrophobic insulating materials include polybutadiene, polyisoprene, polychloroprene (e.g., neoprene), polyisobutylene, styrene-butadiene rubbers, acrylonitrile-butadiene rubbers. Examples of epoxies include bisphenol-based epoxy resins, novolac-based epoxies, cycloaliphatic-based epoxies, and glycidylamine-based epoxies. In some embodiments, the hydrophobic insulating materials may comprise a blend of the above materials.

In some embodiments, the polymer coating 113 can comprise a single homogenous polymer coating. As used herein, a single homogenous polymer coating means that the polymer coating is well-mixed as opposed to comprising discrete regions (e.g., layers) in the direction 215 of the coating thickness 207. In some embodiments, the polymer coating 113 can be cured after it is deposited over the ceramic article 103, as described in the methods below. Providing a polymer coating cured after it is deposited over the ceramic article 103 can enable the polymer coating to conform to the surface (e.g., first major surface 105, outer peripheral edge 108, second majors surface 201) of the ceramic article 103 by, for example, filling defects (e.g., voids, cracks), which can increase the adhesion of the polymer coating and increase the edge strength of the resulting ceramic assembly. Increased adhesion between the polymer coating and the ceramic article can reduce (e.g., prevent) delamination of the polymer coating from the ceramic article, which can be desirable in applications where the polymer coating is part of an end-product. Providing a polymer coating comprising a single homogenous polymer coating can simplify processing and reduce non-uniformity of the properties of the polymer coating.

In some embodiments, the polymer coating 113 can comprise a plurality of polymeric layers. In further embodiments, a first layer of the plurality of polymeric layers can comprise the first major surface 115 of the polymeric coating. In even further embodiments, the first layer of the plurality of layers can comprise one of the polymeric materials listed above. In still further embodiments, the first layer of the plurality of layers can comprise polyethylene, polypropylene, PET, PTFE, a polyimide, an acrylic polymer, or an elastomer (e.g., rubber). In further embodiments, a second layer of the plurality of polymeric layers can comprise the second major surface 203 of the polymer coating 113. In even further embodiments, the second layer can comprise an adhesive polymer. In even further embodiments, the second layer can comprise a polymeric pressure sensitive adhesive. In still further embodiments, the second layer can comprise a block copolymer, for example, a styrene-rubber block copolymer. In even further embodiments, the first layer and/or the second layer of the plurality of layers can be cured before it is deposited over the ceramic article. In even further embodiments, the polymer coating (e.g., second layer of the plurality of polymeric layers) can comprise a high-temperature release film, meaning that the adhesion of the polymeric coating (e.g., second layer of the plurality of polymeric layers) to the ceramic article decreases above a predetermined temperature (e.g., 100° C., 150° C., 200° C., 300° C., 400° C.), which can comprise, for example, polypropylene, PVF, ETFE, FEP, polyimide, and/or polymethylpentene. In even further embodiments, the polymer coating (e.g., second layer of the plurality of polymeric layers) can comprise a low-temperature release film, meaning that the adhesion of the polymeric coating (e.g., second layer of the plurality of polymeric layers) to the ceramic article decreases below a predetermined temperature (e.g., 100° C., 50° C., 30° C.). Providing a polymer coating that is cured before it is deposited over the ceramic article can simplify processing because handling of the cured coating can be simpler, and it eliminates a potential curing step from processing the ceramic assembly. Providing a polymer coating that comprises a temperature sensitive release film (e.g., high-temperature release film, low-temperature release film) can reduce processing costs and potential damage to the ceramic article associated with removing the polymer coating in applications where the polymer coating is only used temporarily, for example, during a processing (e.g., deposition) step.

Ceramic assemblies of the embodiments of the disclosure can comprise a threshold amount of adhesion between the polymer coating 113 and the ceramic article 103 as measured using the Tape Test, ASTM D3359. In some embodiments, as shown in FIGS. 3 and 6, the ceramic assembly 301, 601 can comprise an adhesion promoter 302. As shown, in further embodiments, the adhesion promoter 302 can be positioned between the ceramic article 103 and the polymer coating 113. In even further embodiments, as shown, a first major surface 303 of the adhesion promoter 302 can contact the second major surface 203 of the polymer coating 113. In even further embodiments, as shown, a portion the adhesion promoter 302 deposited over the first major surface 105 of the ceramic article 103 can comprise a second major surface 305 of the adhesion promoter 302 opposite the first major surface 303. In still further embodiments, the second major surface 305 of the adhesion promoter 302 can contact the first major surface 105 of the ceramic article 103. In still further embodiments, the first major surface 303 of the adhesion promoter 302 can contact the second major surface 203 of the polymer coating 113. In even further embodiments, as shown, the adhesion promoter 302 can be deposited over the edge portion 107 and/or outer peripheral edge 108 of the ceramic article 103. In even further embodiments, as shown, the adhesion promoter 302 can be deposited over at least a portion of the second major surface 201 of the ceramic article 103. In still further embodiments, as shown, the adhesion promoter 302 can be deposited over the entire second major surface 201 of the adhesion promoter 302. In still further embodiments, a portion of the adhesion promoter 302 deposited over the second major surface 201 of the ceramic article 103 can comprise a first major surface 601 and a second major surface 603 opposite the first major surface 601 of the adhesion promoter 302. In yet further embodiments, the first major surface 601 of the adhesion promoter 302 can contact the second major surface 201 of the ceramic article 103. In yet further embodiments, the second major surface 603 of the adhesion promoter 302 can contact the first major surface 507 of the polymer coating 113 deposited over the second major surface 201 of the ceramic article 103. In some embodiments, although not shown, one or more layers may be positioned between the adhesion promoter 302 and the ceramic article 103 and/or between the adhesion promoter 302 and the polymer coating 113.

In some embodiments, as shown in FIGS. 3 and 6, the polymer coating 113 can be deposited over the adhesion promoter 302. In further embodiments, the polymer coating 113 can cover the adhesion promoter 302. In further embodiments, the adhesion promoter 302 can be deposited over substantially the same portion(s) of the ceramic article 103 as the polymer coating 113. An adhesion thickness 307 of the adhesion promoter 302 can be defined between the first major surface 303 of the adhesion promoter 302 and the second major surface 305 of the adhesion promoter. In some embodiments, a direction of the adhesion thickness 307 of the adhesion promoter 302 can be the direction 215 of the article thickness 205. In some embodiments, a direction of the adhesion thickness 307 can be substantially perpendicular to the direction 117 of the width 109 and/or the direction 119 of the length 111. In some embodiments, the adhesion thickness 307 of the adhesion promoter 302 can be about 1 nanometer (nm) or more, about 100 nm or more, about 500 nm or more, about 2 µm or less, about 1 µm or less, or about 500 nm or less. In some embodiments, the adhesion thickness 307 of the adhesion promoter 302 can be in a range from about 1 nm to about 2 µm, from about 1 nm to about 1 µm, from about 1 nm to about 500 nm, from about 100 nm to about 2 µm, from about 100 nm to about 1 µm, from about 100 nm to about 500 nm, from about 500 nm to about 2 µm, from about 500 nm to about 1 µm, or any range or subrange therebetween. In some embodiments, as shown in FIGS. 3 and 6, an adhesion promoter need not be part of the ceramic assembly.

In some embodiments, the adhesion promoter 302 can comprise one or more of a polydopamine, a silane coupling agent, an amine, and an epoxy. Example embodiments of silane coupling agents include alkyl silanes (, amine silanes (e.g., aminopropyletrimethoxysilane, aminopropyltriethoxysilane, aminoethyltrimethoxysilane, aminoethyltriethoxysilane), mercapto silanes (e.g., mercaptopropyltrimethoxysilane, mercaptopropyltriethoxysilane, mercaptoethyltrimethoxysilane, mercaptoethyltriethoxysilane), including siloxane, silanol, and other derivatives thereof.

In some embodiments, a width and/or length of the ceramic assembly 101, 301, 401, 601 can be substantially equal to the corresponding width and/or length of the ceramic article 103. In some embodiments, the width and/or length of the ceramic assembly 101, 301, 401, 601 can be greater than the corresponding width and/or length of the ceramic article 103 by about the coating thickness 207, about the coating thickness 207 plus the adhesion thickness 307, about twice the coating thickness 207, or about twice the coating thickness 207 plus twice the adhesion thickness. In some embodiments, a thickness of the ceramic assembly 101, 301, 401, 601 can be greater than the length of the ceramic article 103. In further embodiments, thickness of the ceramic assembly 101, 301, 401, 601 can be greater than the length of the ceramic article 103 by about the coating thickness 207, about the coating thickness 207 plus the adhesion thickness 307, about twice the coating thickness 207, or about twice the coating thickness 207 plus twice the adhesion thickness.

Figure 12:
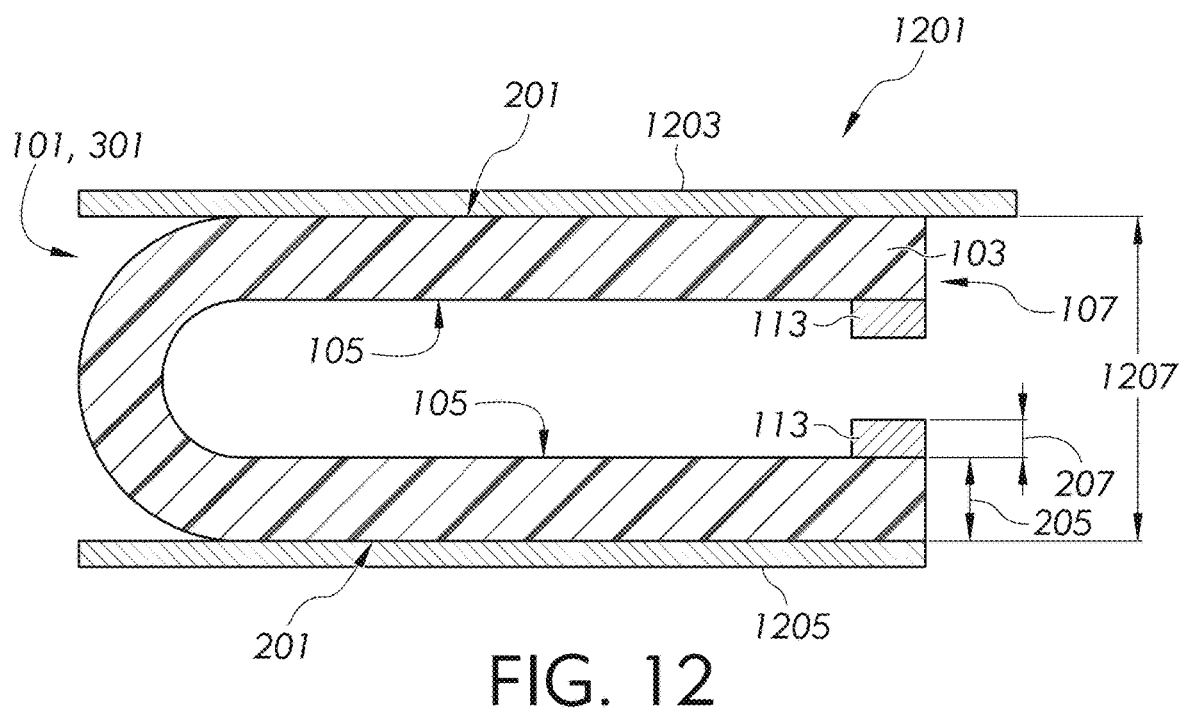
FIG. 12 schematically illustrates a ceramic assembly in an edge strength apparatus in accordance with some embodiments of the disclosure.

Throughout the disclosure, an "edge strength" of a ceramic article or a ceramic assembly is measured with the following test configuration and process using a parallel plate apparatus 1201 (see FIG. 12) that comprises a pair of parallel rigid stainless-steel plates 1203, 1205 comprising a first rigid stainless-steel plate 1203 and a second rigid stainless-steel plate 1205. As shown in FIG. 12, when a ceramic assembly 101, 301 of FIGS. 1-3 is tested, the second major surface 201 of the ceramic article 103 of the ceramic assembly 101, 301 contacts the parallel plates 1203, 1205. Likewise, although not shown, when a ceramic article 103 is tested without a polymer coating, the second major surface 201 of the ceramic article 103 contacts the parallel plates 1203, 1205. Although not shown, if a ceramic assembly 401, 601 shown in FIGS. 4-6 is tested, the second major surface 509 of the polymer coating 113 can contact the parallel plate 1203, 1205. A parallel plate distance 1207 between the parallel plates 1203, 1205 is reduced at a rate of 50 μm/second until failure of the ceramic assembly 101, 301, 401, 601 or ceramic article 103 is observed. As used herein, failure of the ceramic assembly and/or ceramic article refers to visible breakage, destruction, delamination, or crack propagation. In some embodiments, failure can include visible breakage, destruction, delamination, or crack propagation that is accompanied by a sound of at least 10 decibels (dB) within a frequency range from about 15 hertz (Hz) to about 20,000 Hz. The edge strength of the ceramic article and/or ceramic assembly is then computed based on the thickness of the sample (e.g., ceramic article, ceramic assembly), the parallel plate distance at failure, and an elastic modulus of the ceramic article. Specifically, the edge strength of a ceramic article is calculated as 1.198 times the elastic modulus of the ceramic article and the article thickness divided by the difference between the parallel plate distance at failure and the article thickness. As used herein a difference between an edge strength of a ceramic assembly and a ceramic article refers of the difference between the edge strength of ceramic assembly comprising the ceramic article with the polymer coating and any adhesion promoter and the edge strength of just the ceramic article (e.g., without a polymer coating and without any adhesion promoter).

In some embodiments, an edge strength of the ceramic assembly 101, 301, 401, 601 can be about 800 MegaPascals (MPa) or more, about 900 MPa or more, about 1,000 MPa or more, about 1,500 MPa or less, about 1,200 MPa or less, or about 1,000 MPa or less. In some embodiments, an edge strength of the ceramic assembly 101, 301, 401, 601 can be in a range from about 800 MPa to about 1,500 MPa, from about 800 MPa to about 1,200 MPa, from about 800 MPa to about 1,000 MPa, from about 900 MPa to about 1,500 MPa, from about 900 MPa to about 1,200 MPa, from about 900 MPa to about 1,000 MPa, from about 1,000 MPa to about 1,500 MPa, from about 1,000 MPa to about 1,200 MPa, or any range or subrange therebetween. Providing a ceramic assembly 101, 301, 401, 601 with an edge strength within the above specified ranges can simplify and/or reduce the cost of processing (e.g., handling, polishing, shipping) because of the incidence of damage (e.g., cracking) to the ceramic article is decreased (e.g., eliminated).

In some embodiments, an edge strength of the ceramic assembly 101, 301, 401, 601 can be greater than an edge strength of the ceramic article 103 by about 50 MPa or more, about 100 MPa or more, about 300 MPa or more, about 500 MPa or more, about 1,000 MPa or less, about 800 MPa or less, or about 600 MPa or less. In some embodiments, a difference between an edge strength of the ceramic assembly 101, 301, 401, 601 and an edge strength of the ceramic article 103 can be in a range from about 50 MPa to about 1,000 MPa, from about 50 MPa to about 800 MPa, from about 50 MPa to about 600 MPa, from about 100 MPa to about 1,000 MPa, from about 100 MPa to about 800 MPa, from about 100 MPa to about 600 MPa, from about 300 MPa to about 1000 MPa, from about 300 MPa to about 800 MPa, from about 300 MPa to about 600 MPa, from about 500 MPa to about 1,000 MPa, from about 500 MPa to about 800 MPa, from about 500 MPa to about 600 MPa, or any range or subrange therebetween. Providing a ceramic assembly 101, 301, 401, 601 with an edge strength greater than the component ceramic article by an amount within the above specified ranges can simplify and/or reduce the cost of processing (e.g., handling, polishing, shipping) because of the incidence of damage (e.g., cracking) to the ceramic article is decreased (e.g., eliminated).

Methods of manufacturing the ceramic assemblies of the embodiments of the disclosure can be discussed with reference to the flow chart in FIG. 7 and example method steps illustrated in FIGS. 8-11.

In some embodiments, a first step 701 can comprise providing a ceramic article 103. In some embodiments, the ceramic article can be fabricated during the method of forming the ceramic assemblies. In further embodiments, the ceramic article can be purchased (e.g., from a commercial supplier), retrieved from inventory, provided by a third party or otherwise provided without necessarily fabricating the ceramic article as part of the method of forming the ceramic assembly.

If providing the ceramic article 103 comprises fabricating the ceramic article during the method of forming the ceramic assembly, the ceramic article can be fabricated using a wide range of techniques. In some embodiments, the ceramic article can be fabricated by sintering a ceramic green body to form the ceramic article 103. In further embodiments, although not shown, the ceramic green body can comprise polycrystalline ceramic grains bound in a binder (e.g., polyvinyl butyral, dibutyl phthalate, polyalkyl carbonate, acrylic polymers, polyesters, silicones, etc.). In further embodiments, sintering can comprise a process of coalescing (e.g., directly bonding to one another) grains (e.g., of a powdered or granular material) into a solid or porous body (e.g., ceramic article) by heating the grains without completely liquefying the grains such that the crystal structure of the particles or grains remain in the coalesced body. In even further embodiments, sintering can comprise heating the grains to a temperature in range from about 500° C. to about 3200° C., from about 500° C. to about 3000° C., from about 500° C. to about 2500° C., from about 1000° C. to about 3200° C., from about 1000° C. to about 3000° C., from about 1000° C. to about 2500° C., from about 2000° C. to about 3200° C., from about 2000° C. to about 3000° C., from about 2000° C. to about 2500° C., or any range or subrange therebetween.

Figure 8:
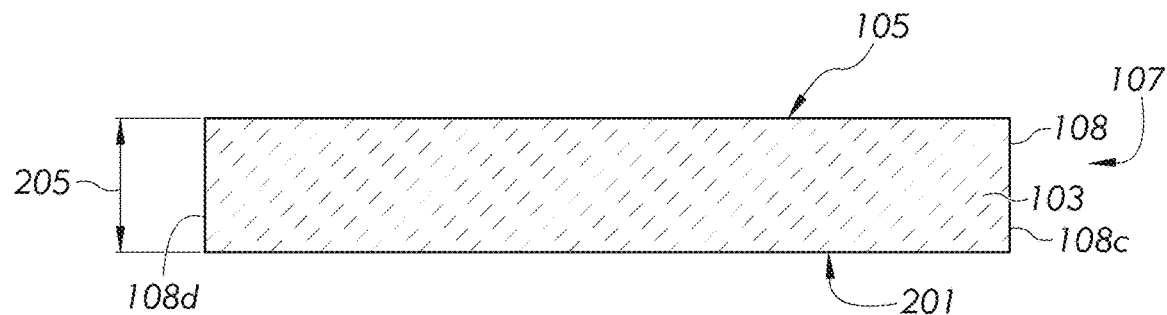
FIG. 8 schematically illustrates a step in a method of making a ceramic assembly in accordance with some embodiments of the disclosure.

As shown in FIG. 8, the ceramic article 103 provided during the first step 701 can comprise the article thickness 205 between the first major surface 105 and the second major surface 201 opposite the first major surface 105. In some embodiments, the article thickness 205 can be within any of the ranges specified above (e.g., about 100 μm or less, in a range from about 40 μm to about 80 μm). As shown, the ceramic article 103 can comprise the edge portion 107 comprising the outer peripheral edge 108 circumscribing the ceramic article 103. In some embodiments, the ceramic article 103 can comprise one or more of the materials specified above (e.g., alumina, zirconia).

Figure 9:
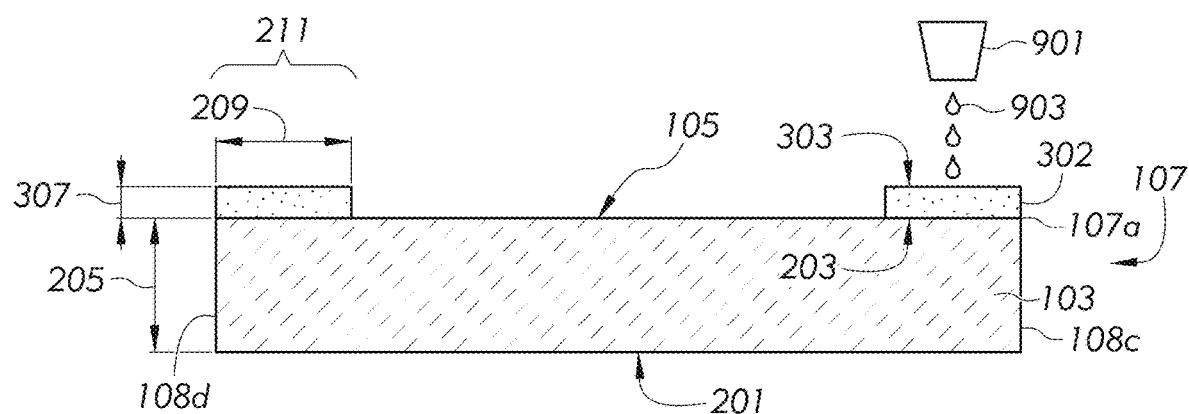
FIG. 9 schematically illustrates another step in a method of making a ceramic assembly in accordance with some embodiments of the disclosure.

In some embodiments, as further shown in FIG. 7, the method of forming the ceramic assembly can comprise a second step 703 of depositing the adhesion promoter 302 over the ceramic article 103. In some embodiments, as shown in FIG. 9, a conduit 901 (e.g., flexible tube, micropipette, dropper, or syringe) may be used to deposit droplets 903 of the adhesion promoter 302 over the ceramic article 103. In some embodiments, although not shown, the adhesion promoter 302 can be deposited on the ceramic article using dip coating, spin coating, chemical vapor deposition, spraying, or other techniques. In some embodiments, although not shown, a portion of the ceramic article 103 can be masked prior to depositing the adhesion promoter 302 to limit where the adhesion promoter 302 is deposited. In some embodiments, as shown, the adhesion promoter 302 can be deposited over the ceramic article 103 such that the adhesion promoter 302 contacts at least a portion of the first major surface 105 of the ceramic article 103. In some embodiments, as shown, the adhesion promoter 302 can be deposited in at least the outer peripheral portion 211 of the first major surface 105 of the ceramic article 103. In further embodiments, the adhesion promoter 302 can be deposited on the ceramic article 103 to form a coating extending for a distance 209 along (e.g., parallel to) the first major surface 105 of the ceramic article 103. In some embodiments, as shown in FIG. 9, the adhesion promoter 302 can extend from the central portion 213 to the first transitional edge 107a of the edge portion 107 of the ceramic article 103. In some embodiments, the adhesion promoter can be deposited on the entire first major surface of the ceramic article. In some embodiments, the adhesion promoter can cover the outer peripheral edge of the edge portion of the ceramic article. In some embodiments, the adhesion promoter can cover at least a portion of the second major surface of the ceramic article. In some embodiments, the adhesion promoter can comprise any of the materials discussed above for the adhesion promoter (e.g., polydopamine, a silane coupling agent, an amine, an epoxy).

Figure 10:
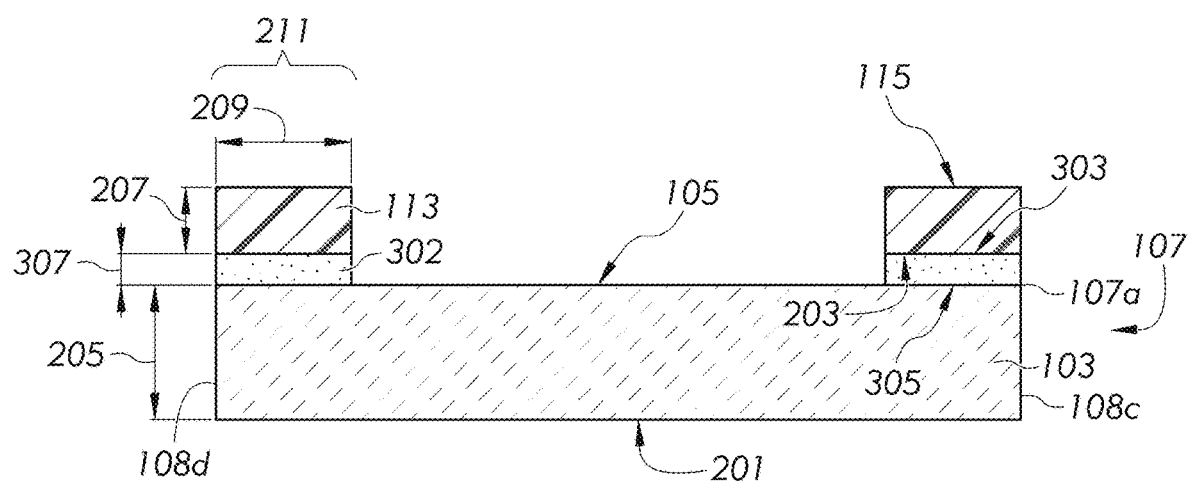
FIG. 10 schematically illustrates another step in a method of making a ceramic assembly in accordance with some embodiments of the disclosure.

In some embodiments, the method of forming the ceramic assembly can comprise a third step 705 of depositing the polymer coating 113 on the ceramic article 103, as shown in FIG. 10. In further embodiments, as shown in FIG. 10, the polymer coating 113 can be deposited over the ceramic article 103 by depositing the polymer coating 113 over the adhesion promoter 302, if present. In some embodiments, although not shown, a conduit (e.g., flexible tube, micropipette, dropper, or syringe) may be used to deposit droplets of the polymer comprising the polymer coating 113 over the ceramic article 103. In some embodiments, although not shown, the polymer coating 113 can be deposited on the ceramic article 103 using dip coating, spin coating, chemical vapor deposition, spraying, or other techniques. In some embodiments, although not shown, a portion of the ceramic article 103 can be masked prior to depositing the polymer coating 113 to limit where the polymer coating 113 is deposited. In some embodiments, as shown, the polymer coating 113 can be deposited over substantially the same portion(s) of the ceramic article 103 as the adhesion promoter 302. In some embodiments, the polymer coating 113 can be deposited over an outer peripheral portion 211 of the first major surface 105 of the ceramic article 103. In further embodiments, the polymer coating can be deposited over an outer peripheral portion 221 but not the central portion 213 of the first major surface 105 of the ceramic article 103. In further embodiments, the polymer coating 113 can be deposited over the ceramic article 103 to form a coating extending for a distance 209 along the first major surface 105 of the ceramic article 103. In some embodiments, as shown in FIG. 10, the polymer coating 113 can extend from the central portion 213 to the first transitional edge 107a of the edge portion 107 of the ceramic article 103. In some embodiments, the polymer coating can be deposited on the entire first major surface of the ceramic article. In some embodiments, the polymer coating can cover the outer peripheral edge of the edge portion of the ceramic article. In some embodiments, the polymer coating can cover at least a portion of the second major surface of the ceramic article. In some embodiments, the polymer coating 113 can comprise any of the materials or precursors of the materials discussed above for the polymer coating 113 (e.g., fluorine-containing polymer, imide-containing polymer, phenol-containing polymer, low-loss dielectric polymer) and can optionally comprise a solvent. Precursors can comprise, without limitation, one or more of a monomer, an accelerator, a curing agent, an epoxy, and/or inorganic particles. Solvents can comprise any of those discussed below with regards to cleaning step(s). In some embodiments, the polymer coating 113 can comprise the coating thickness 207 within the ranges discussed above (e.g., about 30 μm or less, from about 5 μm to about 15 μm).

Figure 11:
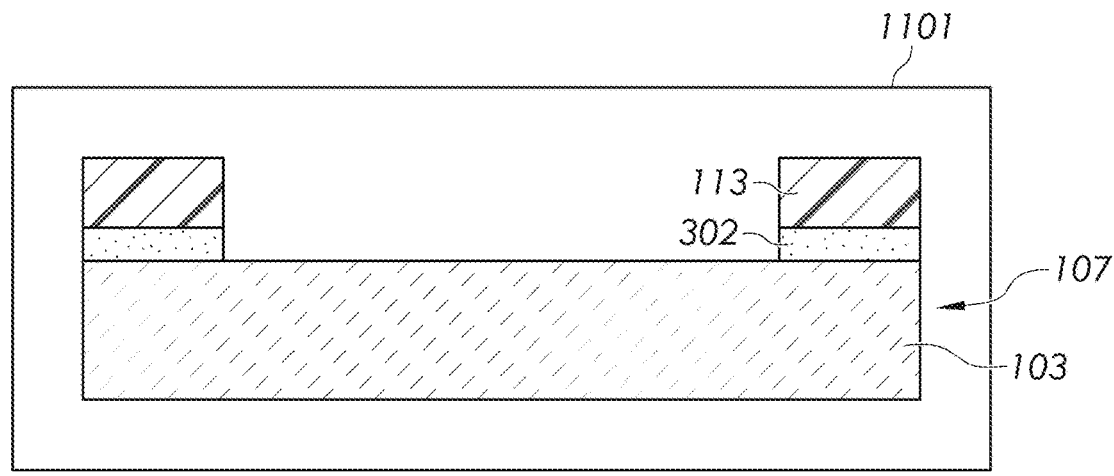
FIG. 11 schematically illustrates another step in a method of making a ceramic assembly in accordance with some embodiments of the disclosure.

In some embodiments, the method of forming the ceramic assembly can comprise a fourth step 707 of curing the polymer coating 113. In some embodiments, as shown in FIG. 11, curing the polymer coating 113 can comprise placing the ceramic article 103 that the polymer coating 113 was deposited on into an oven 1101. In some embodiments, as shown, the curing the polymer coating 113 may comprise heating the polymer coating 113 to a first temperature to cure the polymer coating 113. In some embodiments, the polymer coating 113 may not contain a solvent. In further embodiments, the polymer coating 113 may contain a solvent, where curing the polymer coating 113 can comprise heating the polymer coating 113 to a first temperature to drive off the solvent and then further heating the polymer coating 113 to a second temperature to cure the polymer coating. In still further embodiments, the first temperature may be above the boiling point of the solvent. In further embodiments, heating the polymer coating 113 to a first temperature may polymerize the polymer coating 113, and heating the polymer coating 113 to a second temperature cause the polymer coating 113 to cross-link. In some embodiments, curing the polymer coating 113 may be performed through UV irradiation. In some embodiments, curing the polymer coating 113 may be performed through drying the polymer coating with or without heating. In some embodiments, curing the polymer coating 113 comprises waiting for a period of time in a range from about 15 minutes to about 168 hours, from about 15 minutes to about 24 hours, form about 1 hour to about 168 hours, from about 1 hour to about 24 hours, from about 6 hours to about 168 hours, from about 6 hours to about 24 hours, or any range or subrange therebetween.

In some embodiments, the ceramic assembly 101, 301, 401, 601 can be completely manufactured when a fifth step 709 is reached, and the ceramic assembly 101, 301, 401, 601 can correspond to one or more of FIGS. 1-6 or related embodiments of the disclosure discussed above.

In some embodiments, although not shown, methods of the embodiments of the disclosure can comprise one or more cleaning steps between the above-mentioned steps. For example, in some embodiments, the ceramic article 103 can be cleaned before depositing the polymer coating 113. In some embodiments, cleaning can comprise contacting (e.g., rinsing, wiping) a surface of the ceramic article 103 and/or optionally deposited adhesion promoter 302 and/or polymer coating 113 with a solvent. In further embodiments, the solvent can comprise one or more of a polar solvent (e.g., water, an alcohol, an acetate, acetone, formic acid, dimethylformamide, acetonitrile, dimethyl sulfoxone, nitromethane, propylene carbonate, poly(ether ether ketone)) or a non-polar solvent (e.g., pentane, 1,4-dioxane, chloroform, dichloromethane, diethyl ether, hexane, heptane, benzene, toluene, xylene).

In some embodiments, as shown in FIG. 7, methods can proceed from the first step 701 through the fifth step 709 sequentially following arrow 702 from the first step 701 to the second step 703, arrow 704 from the second step 703 to the third step 705, arrow 706 from the third step 705 to the fourth step 707, and arrow 708 from the fourth step 707 to the fifth step 709. In some embodiments, the second step 703 of depositing the adhesion promoter can be omitted by following arrow 710 from the first step 701 to the third step 705. In some embodiments, the polymer coating 113 may be deposited through a plurality of depositing (e.g., step 705) and curing (e.g., step 707) steps by following arrow 712 and arrow 706 until a predetermined coating thickness 207 is achieved.

Methods of the embodiments of the disclosure can produce a ceramic assembly 101, 301, 401, 601 containing a ceramic article 103, where the ceramic assembly 101, 301, 401, 601 comprises an edge strength greater than an edge strength of the ceramic article 103 alone. In some embodiments, a difference between the edge strength of the ceramic assembly 101, 301, 401, 601 and the ceramic article 103 can be within one or more of the ranges discussed above (e.g., about 50 MPa or more, from about 300 MPa to about 1,000 MPa). In some embodiments, the edge strength of the ceramic assembly 101, 301, 401, 601 can be within one or more of the ranges discussed above (e.g., about 800 MPa or more, from about 900 MPa to about 1,500 MPa).

Ceramic assemblies of the embodiments of the disclosure comprising ceramic articles can decrease (e.g., eliminate) the incidence of damage to the ceramic article relative to the ceramic article alone. Depositing a polymer coating over the ceramic article can increase the edge strength of the ceramic assembly relative to the ceramic article (e.g., by about 50 MegaPascals (MPa) or more, in a range from about 300 MPa to about 1,000 MPa), which can be associated with decreased incidence of damage of the ceramic article. In some embodiments, the polymer coating can provide the ceramic assembly with a high edge strength (e.g., about 800 MPa or more, in a range from about 900 MPa to about 1,500 MPa). Depositing a polymer coating over an outer peripheral portion of the ceramic article can increase the edge strength of the ceramic assembly relative to the ceramic article by reinforcing (e.g., stabilizing, supporting) an outer peripheral portion of the ceramic assembly. In some embodiments, the ceramic article can be a sintered ceramic article, and the polymer coating may strengthen the ceramic article by filling space between ceramic grains comprising the sintered ceramic article. In some embodiments, the polymer coating can strengthen the ceramic article by filling defects (e.g., voids, cracks) at and/or near the edge of the ceramic article, which can decrease (e.g., eliminate) growth (e.g., propagation, elongation) of the defect. Providing a polymer coating that extends from a central portion of the ceramic article to the first transition edge of the first major surface of the ceramic article and, in some embodiments, covers the outer peripheral edge of the ceramic article can increase the edge strength of the ceramic assembly relative the ceramic article by protecting the ceramic article from impacts. Providing an adhesion promoter can increase the adhesion of the polymer coating to the ceramic article, which can further increase edge strength of the resulting ceramic assembly.

Additionally, the ceramic assembly 101, 301, 401, 601 with the deposited polymer coating 113 (with optional adhesion promoter 302) discussed above can increase the edge strength of the ceramic assembly 101, 301, 401, 601 over the edge strength that could be achieved with the ceramic article 103 without the polymer coating 113, thereby reducing the cost of processing (e.g., handling, polishing, shipping) because of the incidence of damage (e.g., cracking) to the ceramic article is decreased (e.g., eliminated). Also, the ceramic assembly 101, 301, 401, 601 of the embodiments of the disclosure can reduce the complexity of processing (e.g., handling, polishing, shipping) the ceramic article 103 because of the decreased (e.g., eliminated) risk of damage to the ceramic article 103. Further, the polymer coating 113 deposited on the ceramic article 103 may be additionally function in a predetermined application of the ceramic assembly 101, 301, 401, 601 and/or ceramic article 103. For example, a low-loss dielectric polymer can be useful in waveguide and/or lightguide applications. For example, a fluorine-containing polymer can be useful in display applications where a functional coating (e.g., hydrophobic, low friction, antireflection, antiglare) may be applied in subsequent processing.

EXAMPLES

Various embodiments will be further clarified by the following examples. Table 1 presents polymer coating thicknesses for Examples A-D as well as measured edge strengths for Examples A-D.

TABLE 1

Coating Thickness and Edge Strength of Examples A-D

| Example | Coating Thickness (μm) | Edge Strength (MPa) |
| --- | --- | --- |
| A | 0 | 650 |
| B | 10 | 981 |
| C | 9 | 961 |
| D | 12 | 881 |

Example A comprises a sintered alumina ribbon comprising an article thickness of 40 μm, a width of 250 mm, and a length of 500 mm. The sintered alumina ribbon was cleaned by sequentially rinsing with acetone, isopropyl alcohol, and deionized water and then drying at 110° C. for 30 minutes. No polymer coating was applied to Example A. An edge strength of 650 MPa was measured using the parallel plate apparatus discussed with respect to FIG. 12.

Example B comprise the sintered alumina ribbon of Example A with a 10 μm coating of polytetrafluoroethylene (PTFE) deposited on a polydopamine adhesion promoter deposited on the sintered alumina ribbon. The polydopamine adhesion promoter was deposited by dip coating the sintered alumina ribbon after the sintered alumina ribbon was rinsed as above to form a coated alumina ribbon. The coated alumina ribbon was then rinsed using deionized water and dried at 110° C. for 30 minutes. Then, the coated alumina ribbon was dip coated in an aqueous solution comprising 10% wt PTFE and cured at 130° C. for 30 minutes. Dip coating and curing were repeated until the predetermined thickness was obtained. As indicated in Table 1, Example B comprised an edge strength of 981 MPa (331 MPa greater than Example A).

Example C comprised the sintered alumina ribbon of Example A with a 9 μm coating of polyimide deposited on an aminopropyltriethoxysilane (APTES) adhesion promoter. The APTES adhesion promoter was deposited by dip coating the sintered alumina ribbon after the sintered alumina ribbon was rinsed as in Example A to form a coated alumina ribbon. The coated alumina ribbon was then rinsed using deionized water and dried at 110° C. for 30 minutes. Then, the coated alumina ribbon was dip coated in an aqueous solution comprising 10% wt polyamic acid, cured at 150° C. for 30 minutes followed by 350° C. for 1 hour to form the polyimide polymer coating. Dip coating and curing were repeated until the predetermined thickness was obtained. As indicated in Table 1, Example C comprised an edge strength of 961 MPa (311 MPa greater than Example A).

Example D comprised the sintered alumina ribbon of Example A with a 12 μm coating of phenolic resin without an adhesion promoter. The sintered alumina ribbon was rinsed as in Example A. The sintered alumina ribbon was dip coated in an aqueous solution comprising 10% wt precursors of the phenolic resin, cured at 150° C. for 30 minutes followed by 300° C. for 1 hour to form the phenolic resin polymer coating. Dip coating and curing were repeated until the predetermined thickness was obtained. As indicated in Table 1, Example D comprised an edge strength of 881 MPa (231 MPa greater than Example A).

Examples B-D increased the edge strength of the ceramic assembly comprising the ceramic article and the polymer coating relative to the ceramic article by 331 MPa, 311 MPa, and 231 MPa, respectively. The polymer coating thicknesses for Examples B-D were in a range from 9 μm to 12 μm. Based on the test results, it is expected that coating thicknesses of about 5 μm would still provide an increase of about 50 MPa or more. Also, Examples B-C exhibited increases in edge strength of about 300 MPa or more (e.g., in a range from about 300 MPa to about 1,000 MPa). Based on the test results, it is expected that coating thicknesses greater than about 10 μm (e.g., about 15 μm, about 20 μm, about 25 μm, about 30 μm) would produce greater increases in edge strengths than those observed for Examples B-D. As such, embodiments of the disclosure can achieve increase in edge strength in a range from about 300 MPa to about 1,000 MPa.

Additionally, Examples B-D exhibited edge strengths of 981, 961, and 881, respectively. All examples exhibited an edge strength of about 800 MPa or more. Examples B-C exhibited edge strengths of about 900 MPa or more (e.g., in a range from about 900 MPa to about 1,500 MPa). Based on the test results, it is expected that coating thicknesses greater than about 10 μm (e.g., about 15 μm, about 20 μm, about 25 μm, about 30 μm) would produce edge strengths greater than those exhibited by examples B-D. As such, embodiments of the disclosure can achieve an edge strength in a range from about 900 MPa to about 1,500 MPa.

In some embodiments, ceramic articles disclosed herein may be made by processes disclosed in US Publication No. 2019/0207252, which is incorporated herein in its entirety. In one or more embodiments, the article exhibits a granular profile, such as when viewed under a microscope, that includes grains protruding generally outward from the body with a height H (e.g., average height) of at least 25 nanometers (nm) and/or no more than 150 micrometers (μm) relative to recessed portions of the surface at boundaries between the grains. In one or more embodiments, the height H is in a range from about 25 nm to about 125 μm, from about 25 nm to about 100 μm, from about 25 nm to about 75 μm, from about 25 nm to about 50 μm, from about 50 nm to about 150 μm, from about 75 nm to about 150 μm, from about 100 nm to about 150 μm, or from about 125 nm to about 150 μm. In other embodiments, the height H may be otherwise sized. In still other embodiments, processing conditions (e.g., time, temperature) may be such that the sintered material has essentially zero height H. In some embodiments, for materials and manufacturing disclosed herein, products (e.g., tape) include a height H of grains of at least 25 nm, such as at least 50 nm, such as at least 75 nm, such as at least 100 nm, such as at least 125 nm, such as at least 150 nm, and/or no more than 200 μm, such as no more than 150 μm, such as no more than 100 μm, such as no more than 75 μm, such as no more than 50 μm. Size and shape of such microstructure may be controlled by as rate of conveyance through the furnace, temperature(s) and temperature profile of the furnace, composition, particle/grain size and density of inorganic material in the green tape, and other factors. Microstructure of the article surface, such as a granular profile or stria caused by abrasive wear or laser sintering, may help facilitate adhesion of polymers disclosed herein to the underlying article by providing interfacial surfaces that are not orthogonal to the corresponding surface plane that may oppose shear loading and provide additional surface area for adhesion when the polymer fills crevices between protruding grains.

As used herein, the terms "the," "a," or "an," mean "at least one," and should not be limited to "only one" unless explicitly indicated to the contrary. Thus, for example, reference to "a component" comprises embodiments having two or more such components unless the context clearly indicates otherwise.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an endpoint of a range, the disclosure should be understood to comprise the specific value or endpoint referred to. If a numerical value or endpoint of a range in the specification recites "about," the numerical value or endpoint of a range is intended to comprise two embodiments: one modified by "about," and one not modified by "about." It will be further understood that the endpoints of each of the ranges are significant both in relation to the other endpoint and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, as defined above, "substantially similar" is intended to denote that two values are equal or approximately equal. In some embodiments, "substantially similar" may denote values within about 10% of each other, for example within about 5% of each other, or within about 2% of each other.

As used herein, the terms "comprising" and "including," and variations thereof, shall be construed as synonymous and open ended, unless otherwise indicated. A list of elements following the transitional phrases comprising or including is a non-exclusive list, such that elements in addition to those specifically recited in the list may also be present.

While various embodiments have been described in detail with respect to certain illustrative and specific embodiments thereof, the present disclosure should not be considered limited to such, as numerous modifications and combinations of the disclosed features are possible without departing from the scope of the following claims.

In one or more embodiments, the sintered article is a continuous sintered article having a width of about 5 mm or greater, a thickness in a range from about 3 µm to about 1 mm, and a length in a range of about 300 cm or greater. In other embodiments, the width is less than 5 mm.

In one or more embodiments, the sintered article exhibits a granular profile, such as when viewed under a microscope, as shown in the digital image of FIG. 13A for an example of such a granular profile structure, and conceptually shown in the side view of FIG. 13B, that includes grains 1034 protruding generally outward from the body 1030 with a height H (e.g., average height) of at least 25 nanometers (nm) and/or no more than 150 micrometers (µm) relative to recessed portions of the surface at boundaries 1032 between the grains 1034. In one or more embodiments, the height H in a range from about 25 nm to about 125 µm, from about 25 nm to about 100 µm, from about 25 nm to about 75 µm, from about 25 nm to about 50 µm, from about 50 nm to about 150 µm, from about 75 nm to about 150 µm, from about 100 nm to about 150 µm, or from about 125 nm to about 150 µm. In one or more embodiments, the height H in a range from about 25 nm to about 125 nm, from about 25 nm to about 100 nm, from about 25 nm to about 75 nm, from about 25 nm to about 50 nm, from about 50 nm to about 150 nm, from about 75 nm to about 150 nm, from about 100 nm to about 150 nm, or from about 125 nm to about 150 nm. In other embodiments, the height H may be otherwise sized. In still other embodiments, processing conditions (e.g., time, temperature) may be such that the sintered material has essentially zero height H. In some embodiments, for materials and manufacturing disclosed herein, products (e.g., tape) include a height H of grains of at least 25 nm, such as at least 50 nm, such as at least 75 nm, such as at least 100 nm, such as at least 125 nm, such as at least 150 nm, and/or no more than 200 µm, such as no more than 150 µm, such as no more than 100 µm, such as no more than 75 µm, such as no more than 50 µm.

The granular profile is or may be an indicator of the process of manufacturing used to form the sintered article 1000. In particular, the granular profile is or may be an indicator that the article 1000 was sintered as a thin continuous article (i.e., as a sheet or tape), as opposed to being cut from a boule, and that the respective surface 1010, 1020 has not been substantially polished. Additionally, compared to polished surfaces, the granular profile may provide benefits to the sintered article 1000 in some applications, such as scattering light for a backlight unit of a display, increasing surface area for greater adhesion of a coating or for culture growth. In contemplated embodiments, the surfaces 1010, 1020 have a roughness from about 10 nm to about 1000 nm across a distance of 10 mm in one dimension along the length of the sintered article, such as from about 15 nm to about 800 nm. In contemplated embodiments, either or both of the surfaces 1010, 1020 have a roughness of from about 1 nm to about 10 µm over a distance of 1 cm along a single axis.

Figure 14B:
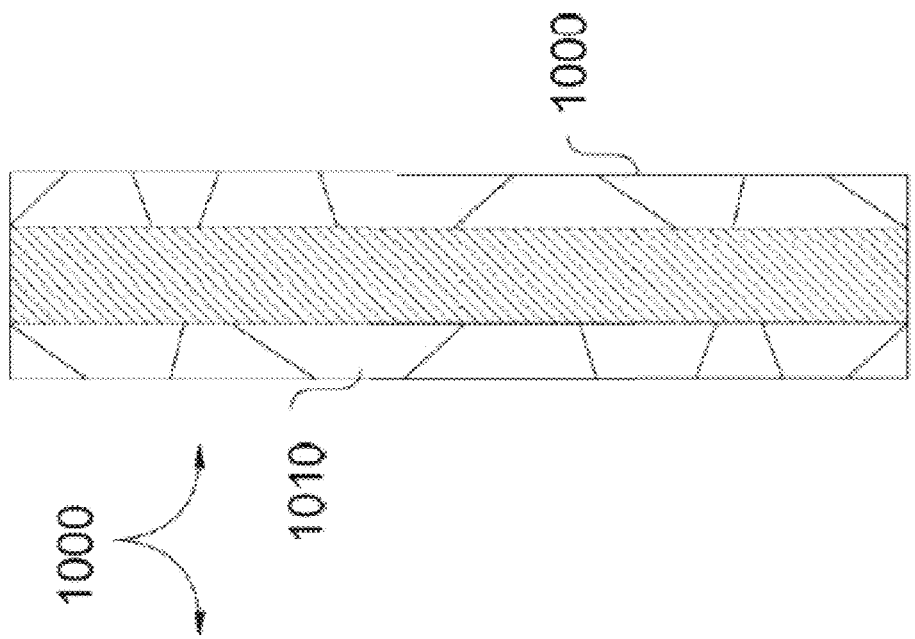
FIG. 14B is a conceptual side profile of the sintered article of FIG. 14A.
Figure 14A:
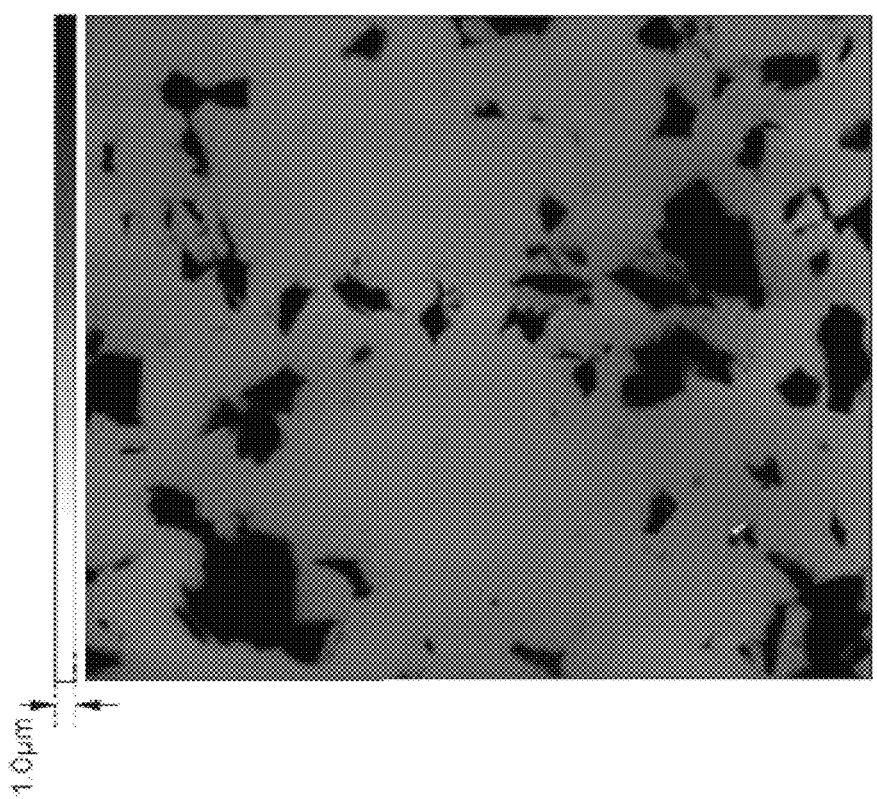
FIG. 14A is a digital image of a polished surface of a sintered article.

In one or more embodiments, the one or both surfaces 1010, 1020 may be polished, where grain boundary grooves and grain asperities (or hillocks) are generally removed due to the polishing. In contemplated embodiments, sintered articles 1000 manufactured according to the processes disclosed herein may be polished, with a surface similar to that shown in FIGS. 14A-14B for example; depending upon, for example, the particular intended use of the article. For example, use of the sintered article 1000 as a substrate may not require an extremely smooth surface, and the unpolished surface of FIGS. 13A-13B may be sufficient; whereas use of the article as a mirror or as a lens may require polishing as shown in FIG. 14A-14B. However, as disclosed herein, polishing may be difficult for particularly thin articles or those that are thin with large surface areas. As indicated, substrates disclosed herein may also receive coatings which may change surface qualities, such as smoothness.

Figure 15:
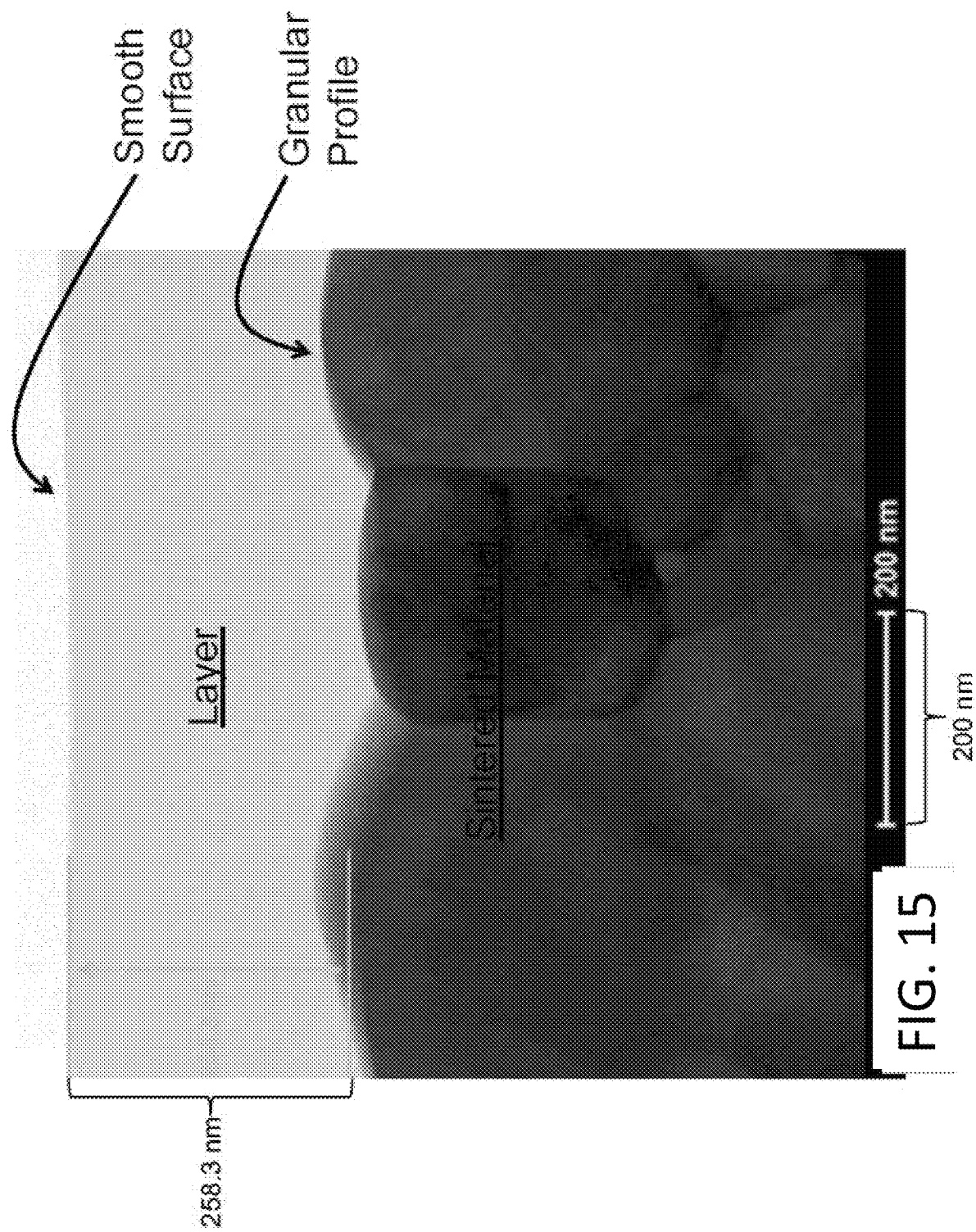
FIG. 15 is a digital image of a sintered material with a layer providing a smooth surface according to an exemplary embodiment.

According to an exemplary embodiment, geometric consistency of the article (e.g. tape) is such that a difference in width of the tape, when measured at locations lengthwise separated by a distance, such as 10 cm, 50 cm, 1 m, 2 m, 10 m is less than a small amount, such as less than 200 µm, less than 100 µm, less than 50 µm, less than 10 µm; and/or a difference in thickness of the tape, when measured at locations lengthwise separated by a distance, such as 10 cm, 50 cm, 1 m, 2 m, 10 m along a widthwise center of the tape (i.e. along the centerline extending the length of the tape), is less than a small amount, such as less than 50 µm, less than 20 µm, less than 10 µm, less than 5 µm, less than 3 µm, less than 1 µm in some such embodiments. Laser trimming may help improve the geometric consistency of the width of the tape. A layer (e.g., silica, a material with melting temperature above 500° C., above 800° C., above 1000° C.), as shown in FIG. 15 overlaying the granular profile, may improve geometric consistency of the thickness and/or may be polished or provide an alternative to polishing.

In some embodiments, the tape is flat or flattenable, such that a length of 10 cm of the tape pressed between parallel flat surfaces flattens to contact or to within 0.25 mm of contact with the parallel flat surfaces, such as within 0.10 mm, such as within 0.05 mm, such as within 0.03 mm, such as within 0.01 mm, without fracturing; and for example in some such embodiments, when flattened to within 0.05 mm of contact with the parallel flat surfaces, the tape exhibits a maximum in plane stress of no more than 10% of the Young's modulus thereof, such as no more than 5% of the Young's modulus thereof, such as no more than 2% of the Young's modulus thereof, such as no more than 1% of the Young's modulus thereof, such no more than 0.5% of the Young's modulus thereof. In some embodiments, the first and second major surfaces of the tape have a granular profile, such as where the grains are ceramic (see FIG. 13B and related discussion, for example), and where at least some individual grains of the ceramic adjoin one another with little to no intermediate amorphous material such that a thickness of amorphous material between two adjoining grains is less than 50 nm, such as less than 10 nm, such as less than 5 nm, such as less than 2 nm, such as where crystal lattices of adjoining grains directly abut one another, as viewed by transition electron microscopy for example.

Moreover, the ability to flatten the sintered articles at such low force indicates that such articles can be manipulated in or subjected to downstream processing without fracturing, breaking or otherwise forming defects. Downstream processes may include, for example, the application of coatings which may include conductive or nonconductive coatings.

In one or more embodiments, a circuit board for electronics comprises a sintered article having electronic conductors patterned on it. The conductors for the circuit board may be directly printed onto the green tape material, the partially sintered article, or the sintered article and/or may be printed onto a coating(s) or layer(s) bonded to the green tape material, the partially sintered article, or the sintered article, such as an adhesion promoting layer, a surface smoothing layer, and/or other functional layers. The printing can be from a direct screen printing, electroless deposition and pattering, lithography, using a silicone carrier intermediate between the pattern formation and the application of the pattern on the sintered article by gavure patterning rollers, and/or by other processes.

The conductors for the circuit board can be directly printed on the partially sintered article, after an intermediate firing step but before the final sintering, and/or printed onto coatings thereon. Porosity in the partially sintered article or sintered article can improve adhesion of the conductor print or pattern. The printing can be from a direct screen printing, lithography, using a silicone carrier intermediate between the pattern formation and the application of the pattern on the ceramic by gavure patterning rollers, or other processes.

Some embodiments of the present disclosure include an article (e.g., sheet, tape or ribbon), such as of inorganic material, such as ceramic, such as alumina or zirconia, with a granular profile and a layer (or coating) overlaying the granular profile to reduce roughness of the granular profile, such as on one or more major surfaces of the article. The layer may be applied in a liquid form through spin coating, slot die coating, spray coating, dip coating, or other processes. In some embodiments, the layer may be amorphous and inorganic, such as glass or converted into solid glass upon thermal annealing or curing. In some such embodiments, the layer is mostly silicon and oxygen, such as with some phosphorous, boron, carbon, nitrogen or other constituents. The layer may also include oxides of Ti, Hf, and/or Al. Such a layer may be applied and cured as part of the same manufacturing line as the binder burnout and sintering, and the resulting article (e.g., tape) may be rolled and include the layer when rolled. In some embodiments, the layer is annealed at temperatures of 850° C. or higher and is very thin, such as a positive thickness less than a micrometer, such as less than 560 nm. In some embodiments, roughness of the layer is less than half that of the granular profile, such as less than a third. In some embodiments, roughness of the layer is less than 15 nm, such as about 5 nm average roughness (Ra or Rq) over a distance of 1 cm along a single axis.

In some examples, yttrium-stabilized zirconia and alumina articles were laser cut into 30×30 mm squares and coated by spin-on-glass, spin coating techniques. A pure silica solution (Desert Silicon NDG series) was tested along with a lightly doped ($10^{21}$ atoms/cm$^3$) phosphorous-doped silica solution (Desert Silicon P-210). The solution was applied in a liquid form, and upon curing solidified. A final anneal densified the glass film. The solutions were applied using spin coating. Samples were then cured either in a hot plate at temperatures between 150° C. and 200° C. or in a vacuum oven with temperatures between 170° C. and 250° C. After the initial cure, samples were annealed in nitrogen atmosphere at temperatures between 850° C. and 1000° C. One-inch square silicon pieces were processed in parallel to the ceramic pieces to provide "witness" samples, used to accurately measure the glass film thickness using optical ellipsometer.

In one example a sheet of 40 μm thick alumina was coated with phosphorous-doped silica (Desert Silicon P210) by spinning at 1500 revolutions per minute (rpm) for 60 seconds, with 133 rpm/second acceleration, resulting in a coating of about 320 nm thick, 15.3 nm Ra, 12.1 nm Rq, 130 nm $Z_{max}$ on one side and 25.9 nm Ra, 20 nm Rq, and 197 nm $Z_{max}$ on the other, where the coated layer had good film quality after furnace anneal at 850° C., with no cracking. In another example a sheet of 40 μm thick alumina was coated with non-doped silica (Desert Silicon NDG-2000) by spinning at 1500 revolutions per minute (rpm) for 60 seconds, with 133 rpm/second acceleration, resulting in a coating of about 444 nm thick, 11 nm Ra, 8.8 nm Rq, 79.4 nm $Z_{max}$ on one side and 22.6 nm Ra, 17 nm Rq, and 175 nm $Z_{max}$ on the other, again where the coated layer had good film quality after furnace anneal at 850° C., with no cracking. By contrast, in another example a sheet of 40 μm thick alumina was coated with non-doped silica (Desert Silicon P210) by spinning at 4000 revolutions per minute (rpm) for 60 seconds, with 399 rpm/second acceleration, resulting in a coating of about 946 nm thick, 5.1 nm Ra, 6.5 nm Rq, 48 nm $Z_{max}$ on one side and 10.8 nm Ra, 14 nm Rq, and 89 nm $Z_{max}$ on the other, where the coated layer had pronounced cracking after furnace anneal at 850° C.

In one example a sheet of 40 μm thick yttria-stabilized zirconia was coated with non-doped silica (Desert Silicon NDG-2000) by spinning at 2000 revolutions per minute (rpm) for 60 seconds, with 1995 rpm/second acceleration, resulting in a coating of about 258 nm thick, 5.9 nm Ra, 4.7 nm Rq, 92 nm $Z_{max}$ on one side, where the coated layer had good film quality after furnace anneal at 1000° C. for 60 minutes, with no cracking. In another example a sheet of 40 μm thick yttria-stabilized zirconia was coated with phosphorous-doped silica (Desert Silicon P210) by spinning at 1500 revolutions per minute (rpm) for 60 seconds, with 133 rpm/second acceleration, resulting in a coating of about 320 nm thick, 8.9 nm Ra, 11.7 nm Rq, 135 nm $Z_{max}$ on one side, again where the coated layer had good film quality after furnace anneal at 850° C. for 30 minutes, with no cracking. By contrast, in another example a sheet of 40 μm thick yttria-stabilized zirconia was coated with non-doped silica (Desert Silicon P210) by spinning at 1500 revolutions per minute (rpm) for 60 seconds, with 133 rpm/second acceleration, resulting in a coating of about 444 nm thick, 7.7 nm Ra, 9.5 nm Rq, 75 nm $Z_{max}$ on one side, where the coated layer had some cracking after furnace anneal at 850° C. Surface morphology of the samples was measured using Atomic-Force-Microscopy on a 10 micron field of view. FIG. 15, for example, shows an electron microscope image of pure silica (Desert Silicon NDG-2000) coated yttria-stabilized zirconia. The layer of silica is about 250 nm thick. Such layers may improve dielectric properties of the tape, and/or serve as a barrier layer to prevent transmission of impurities to/from the underlying material. For example, such layers may be used with LEDs, as disclosed above, or other electronics and packaging, and/or may be applied to sintered tape and rolled as a roll of the tape, as disclosed herein. In other contemplated embodiments, the layer may be another inorganic material, or a polymeric material, such as for different uses.

In some embodiments, the tape further includes an electrically-conductive metal coupled to the first major surface of the body, where in some such embodiments the body comprises a repeating pattern of vias, and the electrically-conductive metal is arranged in a repeating pattern. In some embodiments, the first and second major surfaces have a granular profile, the tape further includes a coating overlaying the granular profile of the first major surface, and an outward facing surface of the coating is less rough than the granular profile of the first surface, such as by at least half (see, e.g., FIG. 15), where electrically-conductive metal coupled to the first major surface is so coupled by way of bonding to the outward facing surface of the coating. In some embodiments, the inorganic material has viscosity of 12.5 poise at a temperature greater than 900° C.

What is claimed is:

1. A ceramic assembly, comprising:
a body comprising ceramic grains sintered to one another, wherein a thickness of the body, between first and second major surfaces thereof, is in a range from 3 μm to 1 mm, and the first and second major surfaces of the body have an unpolished granular profile such that the unpolished granular profile includes grains protruding outward from a respective major surface with a height of at least 25 nm and no more than 150 μm relative to recessed portions of the respective major surface at boundaries between respective grains;
a coating overlaying the unpolished granular profile of the first major surface, wherein an outward facing surface of the coating is less rough than the unpolished granular profile of the first major surface, the coating is disposed over a portion of an edge portion, and the edge portion comprises an outer peripheral edge circumscribing the body; and
an adhesion promoter is positioned between the body and the coating.

2. The ceramic assembly of claim 1, wherein the unpolished granular profile includes grains with a height of at least 150 nanometers relative to recessed portions of the respective major surface at boundaries between the respective grains.

3. The ceramic assembly of claim 2, wherein the height of the grains is no more than 80 micrometers relative to recessed portions of the respective major surface at boundaries between the respective grains.

4. The ceramic assembly of claim 3, wherein the coating fills in crevasses between grains of the unpolished granular profile.

5. The ceramic assembly of claim 1, wherein the body is thicker than the coating.

6. The ceramic assembly of claim 5, wherein thickness of the coating is less than 30 micrometers.

7. The ceramic assembly of claim 1, wherein the grains sintered to one another have an average grain size of 5 μm or less, and wherein over a distance of 1 cm along a single axis, a surface roughness (Ra) of the coating is less than half that of the unpolished granular profile.

8. The ceramic assembly of claim 7, wherein the surface roughness (Ra) of the coating is less than a third that of the unpolished granular profile.

9. The ceramic assembly of claim 1, wherein a surface roughness (Ra) of the coating is less than 15 nm over a distance of 1 cm along a single axis.

10. The ceramic assembly of claim 1, wherein a surface roughness (Rq) of the coating is less than 15 nm over a distance of 1 cm along a single axis.

11. The ceramic assembly of claim 1, wherein the coating is amorphous.

12. The ceramic assembly of claim 1, wherein the coating comprises a material with melting temperature above 500° C.

13. The ceramic assembly of claim 1, wherein the body comprises an oxide.

* * * * *